Figure 1:
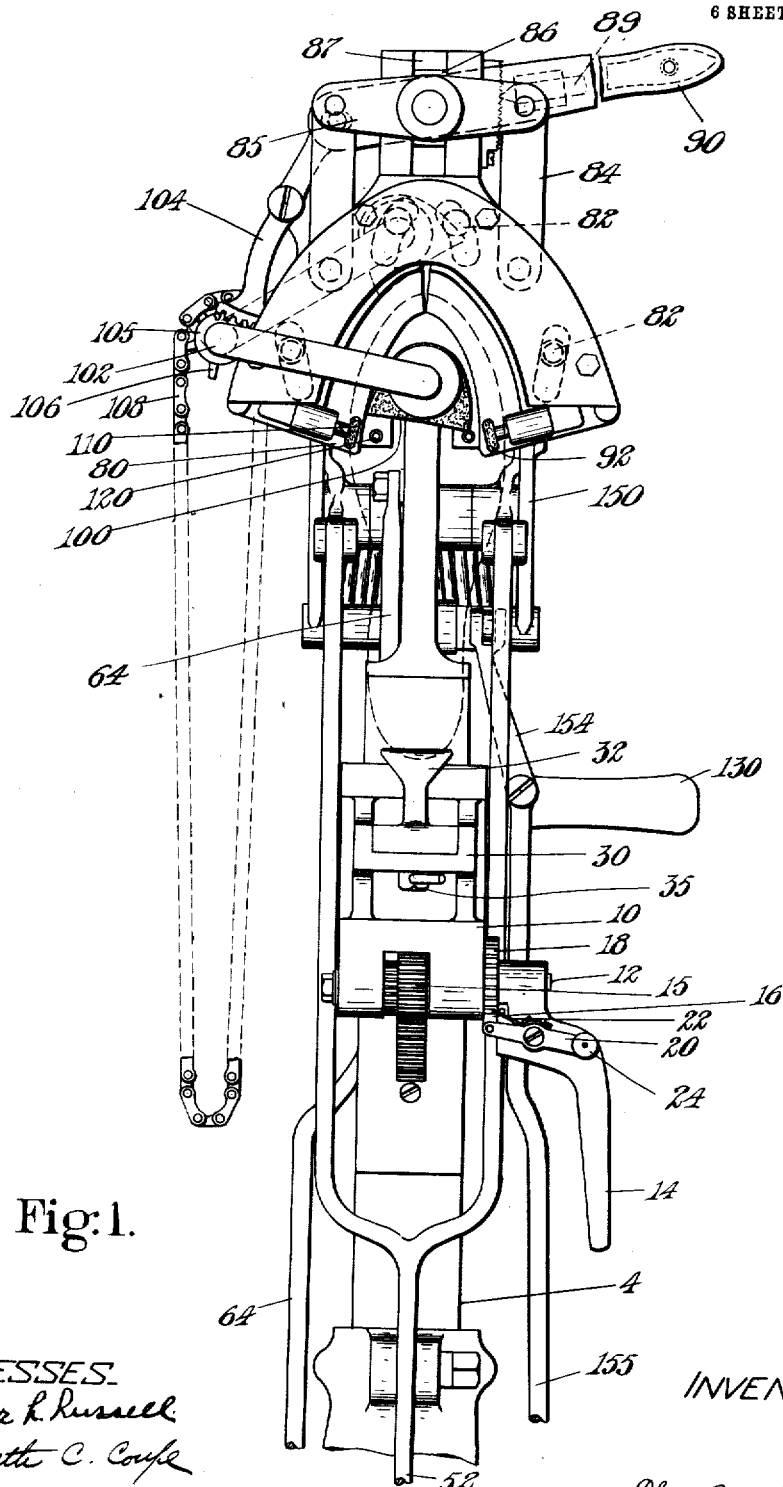

E. BROTHERS.
MACHINE FOR USE IN THE MANUFACTURE OF BOOTS AND SHOES.
APPLICATION FILED JUNE 30, 1908.

1,135,945.

Patented Apr. 13, 1915.
6 SHEETS—SHEET 1.

WITNESSES
Arthur L. Russell
Elizabeth C. Coupe

INVENTOR
Eli Brothers

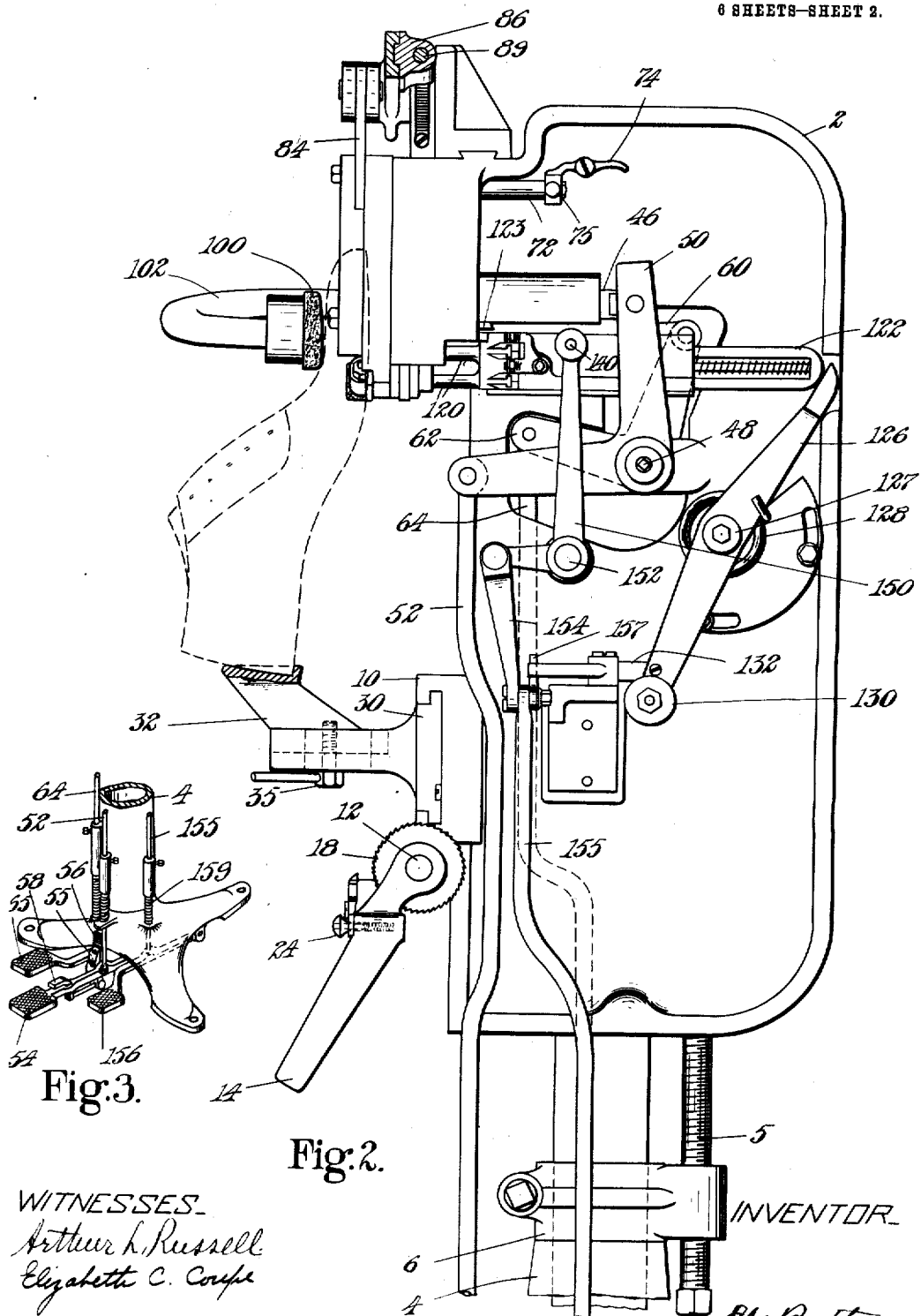

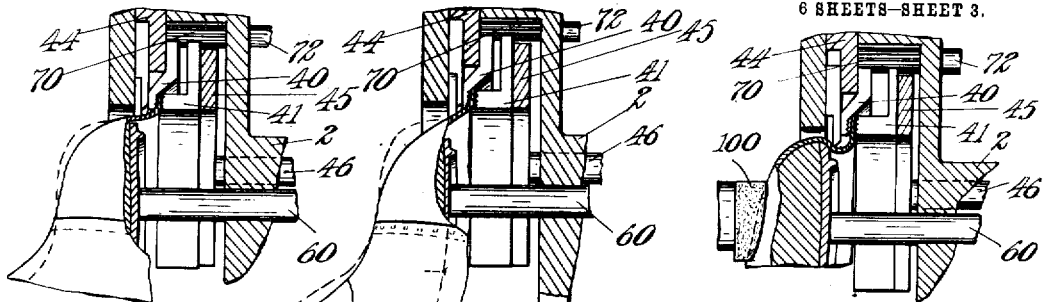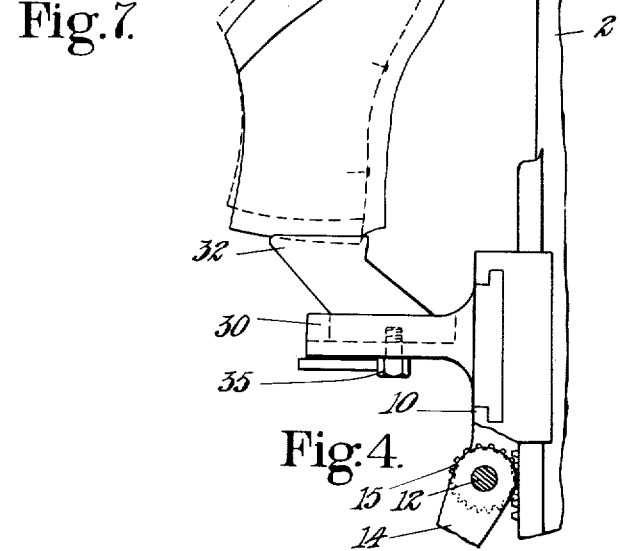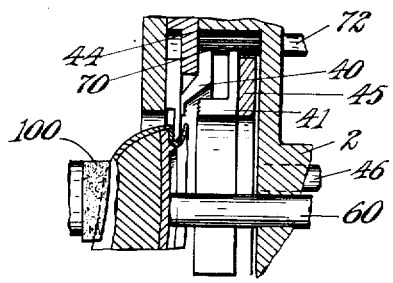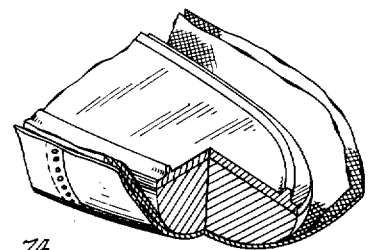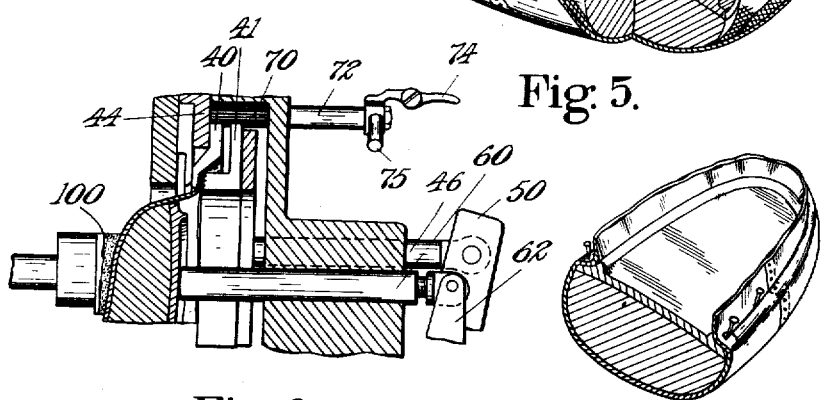

E. BROTHERS.
MACHINE FOR USE IN THE MANUFACTURE OF BOOTS AND SHOES.
APPLICATION FILED JUNE 30, 1908.

1,135,945.

Patented Apr. 13, 1915.
6 SHEETS—SHEET 5.

WITNESSES
Arthur L. Russell
Elizabeth C. Coupe

INVENTOR
E. Brothers

UNITED STATES PATENT OFFICE.

ELI BROTHERS, OF LYNN, MASSACHUSETTS, ASSIGNOR TO UNITED SHOE MACHINERY COMPANY, OF PATERSON, NEW JERSEY, A CORPORATION OF NEW JERSEY.

MACHINE FOR USE IN THE MANUFACTURE OF BOOTS AND SHOES.

1,135,945.     Specification of Letters Patent.     Patented Apr. 13, 1915.

Continuation of application Serial No. 320,610, filed June 7, 1906. This application filed June 30, 1908. Serial No. 441,126.

*To all whom it may concern:*

Be it known that I, ELI BROTHERS, a citizen of the United States, residing at Lynn, in the county of Essex and Commonwealth of Massachusetts, have invented certain Improvements in Machines for Use in the Manufacture of Boots and Shoes, of which the following description, in connection with the accompanying drawings, is a specification, like reference characters on the drawings indicating like parts in the several figures.

This invention relates to machines for working uppers over lasts and has for its general object to provide a machine by which in successive operations a shoe upper may be "pulled-over" or drawn into preliminary position and adjusted on the last and then "lasted" or finally conformed to the shape of the last, and this application is a continuation of an application for Letters Patent of the United States for pulling-over and lasting machines, Serial No. 320,610, filed June 7, 1906, so far as said two applications disclose common subject-matter.

It has heretofore been the practice to pull-over a shoe by hand or by a pulling-over machine and thereafter to last the shoe in a lasting machine. The present invention combines in one machine provision for pulling-over the shoe and provision for lasting the shoe.

This invention has the advantage of reducing the number of machines or independent operations required for the manufacture of a shoe, thus economizing time and factory space and saving at least one handling of the shoe.

Another advantage of this invention is that the lasting of the shoe may be performed immediately after the pulling-over operation and it is, therefore, unnecessary to secure the upper by temporary fastenings for holding it between the pulling-over and lasting operations as has heretofore been necessary.

The invention has numerous other advantages which will be understood by those familiar with the manufacture of shoes, some of which advantages will be hereinafter pointed out.

As I am advised it is new with me to provide a machine in which a shoe upper and a last can be relatively moved to stretch the upper and to adjust it with its lines—as, for example, the toe tip seam—in desired relation to the last and which is provided with means for lasting the shoe.

One important feature of this invention consists in novel mechanism for pulling-over a shoe, comprising means for gripping the upper at opposite sides of the last and means for relatively actuating the gripping means and the last to pull the upper, said mechanism having provision for allowing relative movement of the last and upper to adjust the last with relation to the upper. As herein shown the last is rested against an abutment about which the last may be moved as a fulcrum or pivot for adjusting it with relation to the upper held by the grippers. In the illustrated embodiment of the invention the machine is constructed and arranged to present unobstructed space about the bottom and sides of the last to allow for movement of the last. This construction permits the last to be turned about an axis extending in the direction of the thickness of the last. This adjustment may be useful for straightening the last and toe tip seam relatively. The last may also be turned about an axis extending lengthwise of the shoe. By this means the relative pull on the two sides of the upper may be varied or the last may be shifted rotatively in the upper for positioning the last transversely with relation to the median line or lace opening of the upper. A further adjustment of the last may be made by tipping the last about an axis extending transversely of the last bottom. In this way the upper may be tightened or slackened as to its longitudinal strain over the top of the last. In addition to these movements the last may be adjusted lengthwise in the upper—as, for instance, to position the toe tip seam and the end of the last relatively. In practice it is important that the toe tip seam of each shoe of a pair of shoes be located at the same distance from the end of the shoe and it is the custom of hand workmen in pulling-over shoes to apply a measuring instrument to each shoe and then to pull the uppers longitudinally until each tip seam is in the same position.

In accordance with a feature of this invention the machine is provided with a heel engaging member and with manually operated means for actuating it to move the last longitudinally with relation to the grippers which hold the upper whereby lengthwise adjustment of the last and upper relatively can be effected. Preferably the grippers are constructed and arranged to hold the upper away from the sides and edges of the last whereby the last can be moved more readily under or with relation to the upper. As herein shown, the grippers engage the upper at the end and at opposite sides of the forward portion of the last and are formed with substantially continuous curved jaws for receiving the edge of the forward portion of the upper from one side around the toe end to the other side.
The curvature of the gripper jaws is preferably greater than that of the end of the last so that the jaws are adapted to receive in its normal outstanding or flaring position the marginal portion or edge of an upper loosely applied to the forward portion of a last.

These features of the invention are believed to have great advantages in a machine of this class, particularly in facilitating the making of the shoe without forming wrinkles in the upper.

A valuable characteristic of the preferred construction of the machine is that the several parts of the mechanism are arranged to permit to the operator an unobstructed view of the top and preferably also the side faces of the shoe so that he may be aware, as the operation proceeds, of the fit and position of the upper upon the last and may tip or rock the last as may be required to correct any defects that may be observed in fit of the upper or make any adjustments that may be required. As shown the abutment for the last is the part which is actuated while the grippers have no movement to pull the upper. This abutment is manually moved as herein illustrated and this gives opportunity for the adjustments of the upper and last to be made while the pulling is being effected if desired and before the maximum pulling tension is applied to the upper. This arrangement for manual relative actuation of the abutment and the grippers to pull the upper also permits the tension on the upper to be relaxed to reduce the frictional engagement of the upper materials with the last and facilitate the adjustment of the last in the upper.

A further feature of this invention consists in forming in sections gripper jaws which together are shaped and arranged to adapt them to the curvature of the last. As herein shown, the jaws are formed in right and left sections which can be adapted to the shape of the last whereby wide and narrow lasts can be provided for and also crooked lasts in which the shapes of the two sides of the forward portion of the shoe differ from one another in the right and left lasts. The sectional jaws may be made readily removable so that one or both can at any time be replaced by another of different shape, but preferably and in accordance with a further feature of this invention which is believed to be of much importance in machines of this class the jaws are shiftable to adapt them to the contour of the last over which the upper is to be pulled and preferably the jaws are operatively connected with means by which they can be readily adjusted. The adjustment of the jaws or sections having opposed gripping faces may well be effected simultaneously and advantageously the adjustment of the sections at opposite sides of the shoe will be separately effected so that the jaws may be adapted to right and left crooked lasts. As herein shown, the jaws are secured on their carriers by pin and curved slot connections, the slots being formed to predetermine the direction of the movement of the jaws when they are adjusted in the illustrated construction to insure that the sections turn about an axis located substantially in the gripping faces so that a substantially continuous gripping face will be maintained by the several sections in their different adjustments. The jaws are shown as having toothed outer edges that are engaged by pinions on adjusting shafts and locking means is provided for securing the parts in their adjusted positions. The movable jaws or sections slide on the pinions in their opening and closing movements to grip and release the upper.

A further feature of the invention consists in the novel construction and relative arrangement of the mechanism for lasting the shoe after it has been pulled-over.
While in its broadest aspect, the invention is not limited to any particular form or arrangement of devices for lasting the shoe, as herein shown there are employed for this purpose wipers connected with actuating mechanism by which they are advanced lengthwise of the last and simultaneously closed inwardly from the opposite sides of the last to lay the upper over the last bottom. For sustaining the last against the pressure of the wipers a rest is provided which is movable longitudinally of the shoe from a position above and out of operative relation with the shoe. The top face of a shoe adjacent to its toe end is somewhat sloping and the rest is preferably arranged for movement along this sloping face until it comes into firm bearing with the shoe. By this arrangement the rest automatically adjusts itself into position for supporting against the pressure of the wipers shoes of slightly different thickness. The same end would of course be gained if the rest were movable in a guideway inclined to the plane in which the shoe stands. As herein shown, provision is made for actuating the rest perpendicularly to the plane of the shoe bottom to force the shoe backward against the wipers for pressing the overlaid upper into place against the innersole.

A further broad feature of this invention consists in the coöperative relation which exists between the upper seizing and holding means and the wipers. This means is shown as comprising a member over which the marginal edge of the upper can be outspread and upon which the upper can be held by the other member to maintain the upper free from wrinkles while the wipers move under the holding means to lay the upper smoothly over the last bottom. These members, herein illustrated as curved sectional gripper jaws and frequently referred to as "jaws" for the purpose of designation without any intention to imply a limitation as to their construction, form means independent of the wipers for holding the upper at the toe outspread while the wipers advance and close. The action of the jaws in so holding the edge of the upper outspread and under tension prevents the formation of wrinkles while the wipers lay the upper over the last bottom. As shown in the accompanying drawings the upper gripping and holding jaws are substantially co-extensive with the wipers and they hold the upper outspread at the sides of the toe adjacent to the ends of the wipers and the tip seam, as well as around the end of the toe. The efficiency of the end portions of the wipers in lasting the upper tightly at the sides of the toe is greatly increased by holding the upper from slipping freely during the closing of the jaws at the sides of the toe. Advantageously the combination operates to hold the upper away from the side faces of the last near the edge of the last bottom while the upper is being stretched and until it is folded or wrapped across the edge of the sole. It is contemplated that while the wipers are being closed the upper holding pressure on the upper will be relaxed sufficiently to allow its edges to be pulled under tension from the jaws. The provision herein described for adjustment of the upper holding jaws enables them to be used in coöperation with wipers of varying shapes in lasting wide and narrow shoes or right and left crooked shoes.

The lasted upper may be secured in overworked position in any suitable manner and as herein shown means is provided for inserting tacks. These tacks may be driven at appropriate distances apart for holding the upper in lasted position, but preferably in machines designed for operating on welt shoes two tacks only will be driven at each side of the last and the wipers will form in the overworked upper material forced against the usual rib of the welt innersole an angular seat or crease to receive a wire, tape, or the like by which the upper between the tacks will be bound in lasted position.

These and other features of the invention, including certain details of construction and combinations of parts, will be hereinafter described and pointed out in the claims, but the improvements in methods of making shoes herein disclosed is claimed in a divisional application Ser. No. 851,194, filed July 15, 1914.

Figure 11:
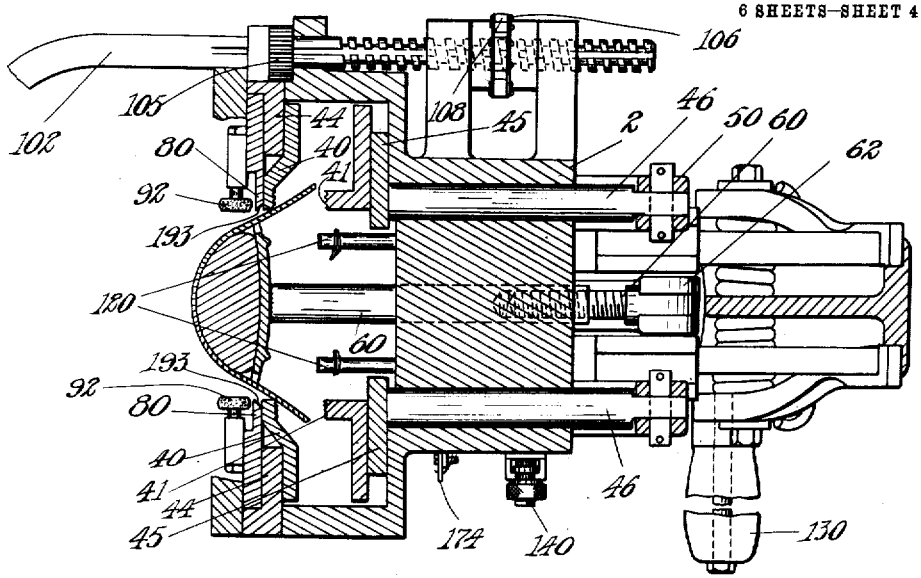
Figures 12, 13:
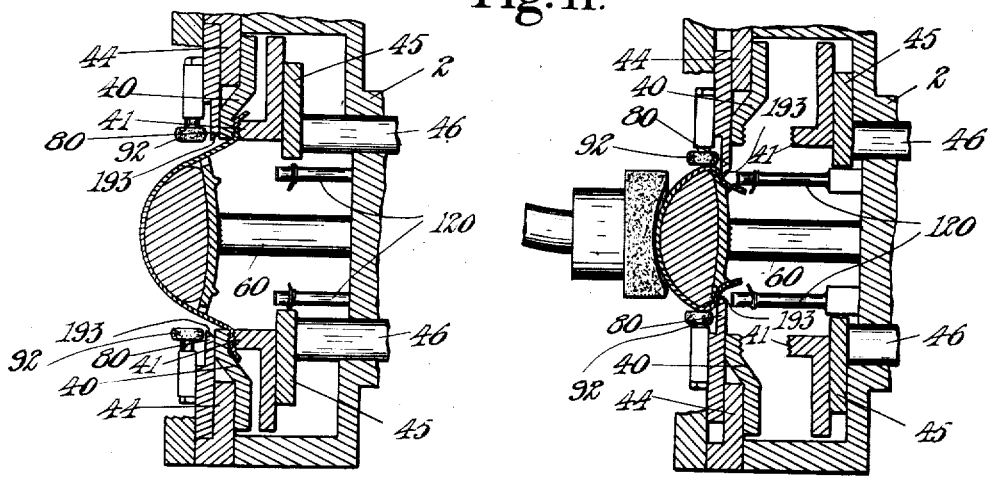
Figures 14, 15:
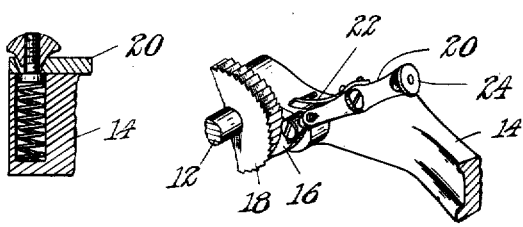
Figures 16, 17, 18:
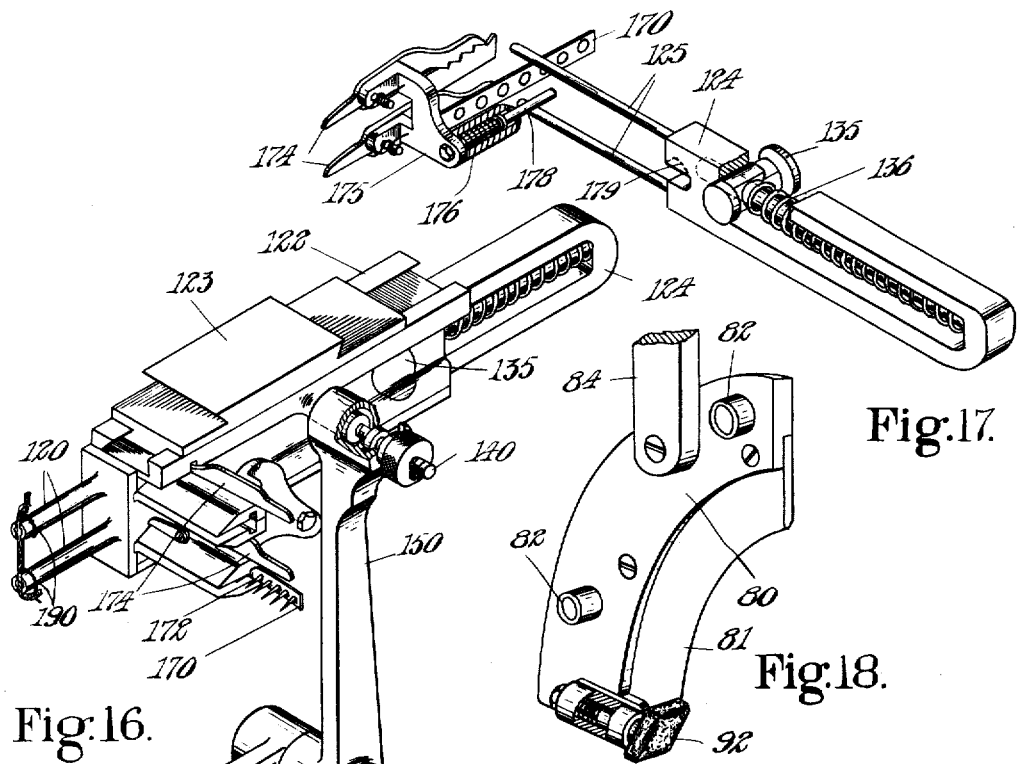
Figure 19:
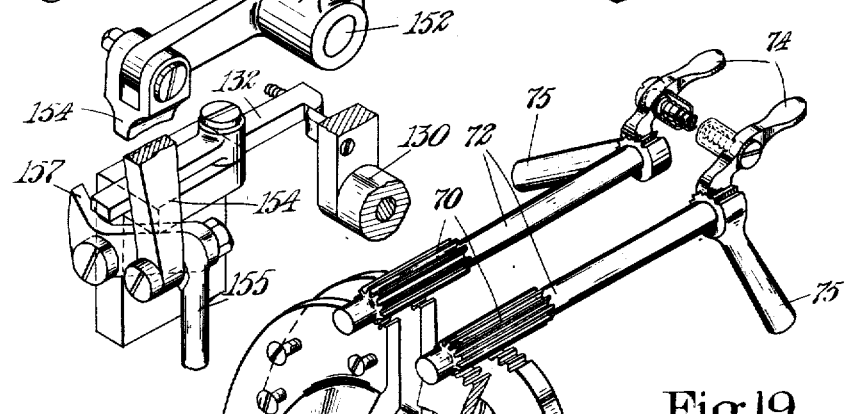
Figure 20:
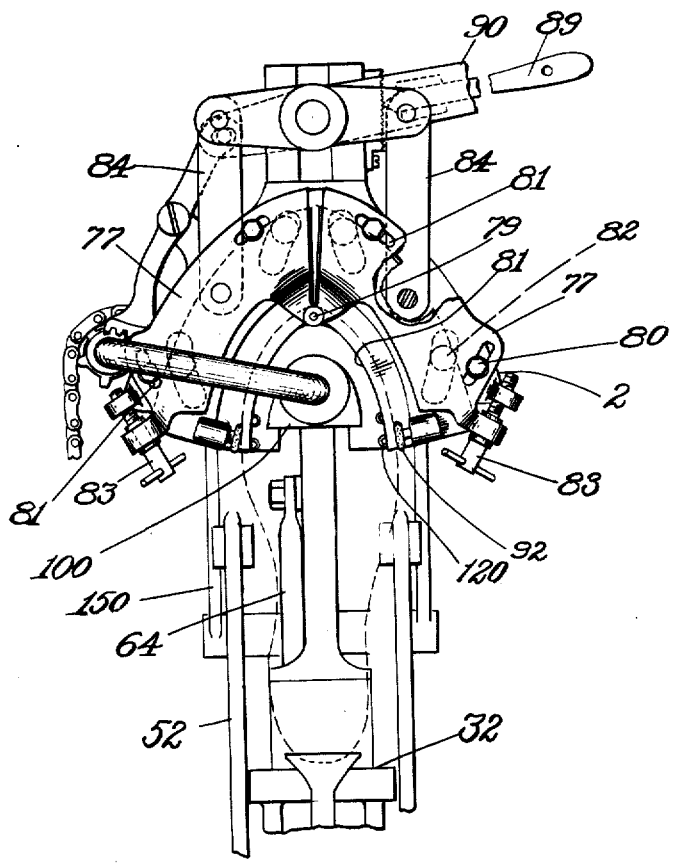

Figure 1 is a front elevation of a machine embodying the present invention. Fig. 2 is a side elevation. Fig. 3 is a perspective view of the lower portion of the machine showing the arrangement of treadles. Fig. 4 is a side elevation, partly in vertical section, showing the relative position of the parts when the upper has been gripped and pulled to some extent. The dotted lines indicate positions to which the shoe may be moved for varying the relative strains on different portions of the upper and adjusting the last and the upper relatively. Fig. 5 is a perspective view showing the forward portion of the upper loosely applied to the last and illustrating the normal outstanding relation of the upper to the side faces of the last. Figs. 6, 7, 8, and 9 show successive stages in the operation of pulling the upper, relatively adjusting the upper and the last, and working the whole upper over the last bottom into lasted position. Fig. 10 shows the forward portion of a shoe which has been pulled over and lasted by the machine. Fig. 11 shows a horizontal section through the machine and illustrates a shoe in position for the upper to be gripped. Fig. 12 shows the grippers closed and the abutment advanced to force the last forwardly and stretch the upper between the last and the grippers. Fig. 13 shows the wipers advanced to lay the upper over the last bottom, the grippers being open. This figure also shows the tack tubes advanced into position for the driving of the tacks. Figs. 14 and 15 are details of a pawl-controlling device. Fig. 16 is a perspective view of the tacking mechanism located at one side of the shoe. Fig. 17 is a perspective view of some of the parts shown in Fig. 16, other parts being omitted. Fig. 18 is a perspective view of one of the wipers and its associated parts, including the side clamp which is carried by the wiper. Fig. 19 is a perspective view of the grippers and their adjusting mechanism. Fig. 20 illustrates the application of a binder of continuous material for holding the upper in lasted position.

The machine comprises a head 2 which has a depending stem that extends into a post or base 4. A screw 5 working in a clamp 6 gives provision for adjusting the head to position the operating devices at a convenient height for the workman to see the shoe for ascertaining the relation of the different parts of the upper to the last as the operation progresses. The clamp 6 may be tightened for securing the head in adjusted position. The head has on its front face an upright guide having a slide 10 in which is a shaft 12 having a hand lever 14 and a pinion 15 that engages a rack formed on the front face of the head whereby the height of the slide can be adjusted. A pawl 16 on the hand lever engages a fixed ratchet 18 to lock the lever and the pawl has a connection with a finger bar 20 which is pivoted to the hand lever 14 and acted upon by a spring 22. For manipulating the finger bar 20 a spring-pressed plunger is mounted in the lever 14 and has a tapering head 24 movable between the inclined walls of the finger bar so that when the head is depressed it turns the finger bar in the direction to lift the pawl from the ratchet. A block 30 is mounted for transverse movement in the slide 10 and carries the shoe rest 32, which in turn is mounted on a block for adjustment from and toward the machine. The rest is formed to receive the heel end of a shoe presented upright or toe upward, as shown in Fig. 2, and is arranged to support the shoe at a sufficient distance outward from the head of the machine to permit the workman to have a substantially unobstructed view of the sides as well as the top face of the shoe and also to be able to see the shoe bottom to a considerable extent if occasion requires. The adjustment of the rest inwardly and outwardly provides for properly positioning lasts of different shape—as, for example, lasts having more or less spring—and a handled clamping screw 35 is arranged to lock the rest in its adjusted position. The several arrangements for shifting the position of the rest permit it to be adjusted for differences in swing as well as spring of lasts so that the forward portion of different lasts may be presented in substantially the same relation to the devices for operating on the shoe which occupy a fixed or constant position in the machine.

The devices that operate on the shoe comprise gripper jaws 40, 40, 41, 41 adapted to grip the upper at the end and at the opposite sides of the forward portion of the last. The jaws are formed in accordance with the contour of the marginal portion of the upper as the latter, applied loosely to the last, flares outwardly from the side faces of the last, as shown in Fig. 5. The lower sectional jaw 40, 40 has a formed edge, Fig. 19, conforming substantially to the outline of the toe of the shoe to be lasted and is mounted at the rear or upper side of the wiper so that when the shoe is placed in the machine the outwardly flared marginal portion of the upper will be spread over it in position to be gripped against the formed edge of the jaw by the coöperating member, which is the jaw 41, 41. The upper is thus gripped and held independently of the wiper plates 80, later described, and their movement is not resisted by the pressure of the holding member 41, 41. It is to be noted that the jaw 40 does not move with the closing-in movement of the wiper plates, nor with their advancing movement, over the edge of the sole and therefore the edge of the upper is held outspread throughout the lasting operation and is prevented from wrinkling. These jaws are preferably formed in sections (as shown best in Fig. 19) which are arranged for relative adjustment to adapt the grippers for lasts of different widths or different shapes. The jaws 40 are shown as mounted by pin and curved slot connections 42 on a fixed portion 44 of the head. The jaws 41 are held by similar pin and curved slot connections to the movable plates 45, which are the heads of rods 46 through which the jaws 41 are actuated to seize and release the upper. The rods 46 are joined to the upper arms of bell cranks 50 which are fulcrumed at 48 on the head and are each pivoted to a forked upper end of a rod 52 that runs to a treadle 54. The treadle has a pawl 55 which engages a ratchet 56 on the post 4 and is actuated by a lever 58 arranged in the treadle to be engaged by the toe of the operator's foot resting on the treadle.

The jaws 40 are formed in transverse section or end elevation as shown in Figs. 4 and 11 with ribbed gripping faces on the marginal edge of the rear side and an outwardly flaring neck between the gripping face and the attaching portion for the purpose of accommodating the position of the outwardly flaring portion of the upper. The jaw 41 is angular in transverse view, as may be seen in said figures, with its gripping face on its forwardly projecting edge and presents a space to the neck of the coöperating jaw to facilitate the insertion of the upper preparatory to gripping it.

The relative movement of the grippers and the last for straining the upper is effected by forcing the last forwardly by an abutment or bottom rest 60, shown as a rod sliding in the machine head and connected at its rear end with a bell crank 62 that is joined by a rod 64 to a treadle 65. It is to be observed that the grippers receive the upper in its normal outwardly flared position so that no wrinkling or puckering of the edge of the upper is required for inserting it into the grippers. It will also be noted that in the illustrated construction the grippers make continuous engagement with the upper on the forward portion of the last from one side of the shoe around the toe end to the other side so that no wrinkle or fold is permitted to form in the edge portion of the upper. The grippers hold the upper in its normal outwardly flaring position away from the side face of the last, as shown in Figs. 4 and 12, while it is strained over the top of the last to conform it to the irregular surface of the last with the least amount of friction and without opportunities for wrinkles to be started during the pulling-over operation. After the upper has been stretched or pulled or while it is being strained the last may be moved to effect proper relative adjustment of the last and upper for correctly positioning the upper with the lace opening or median line in the right location and with the toe tip seam or line straight and at the right distance from the toe end of the last. This adjustment is effected, as will be understood from the foregoing description of the machine, by moving the last with relation to the abutment. The sole-engaging end of the rest is so formed that the last may be easily rocked or turned sidewise about its lengthwise axis for shifting the last in the upper in a direction transverse to the last to locate the lace opening, and said rest is also formed to permit the last to be turned upon its rest as a pivot, by swinging the heel laterally and thus turning the last within the upper for effecting a relative adjustment to straighten the toe tip seam. For accommodating these movements the bottom rest may advantageously have a single engaging face upon which the last may be easily moved. For relatively adjusting the last and upper lengthwise to position the tip seam at the desired distance from the toe end of the last or to stretch the upper lengthwise the last may be moved by the heel rest and its operating lever 14. By moving the last upwardly as indicated in dotted lines in Fig. 4 its toe portion is thrust into the gripped forward portion of the upper and while advancing stretches the upper lengthwise and conforms it tightly to the surfaces of the toe end of the last. The bottom rest may have a smooth face engaging the innersole to facilitate this adjustment of the last. For effecting the adjustment of the grippers which has been referred to these jaws are formed with teeth on their upper or outer edges, as shown in Fig. 19, and these teeth of each pair of jaws 40, 41 are engaged by one long pinion 70 formed on a shaft 72 which is rotatable in the head 2 and has an operating handle 75. The pinion permits the necessary sliding movement of the jaws 41 that is incident to their gripping and releasing action. The pins of the pin and curved slot connections 42 are preferably not set up tight, but permit the movement of the jaws by the shaft 72 at any time and the shaft has a ratchet that is engaged by a pawl 74 for locking the gripper jaws in their adjusted positions. The said curved slots are formed so that they compel the jaws in the adjusting movement to turn about a center which is located substantially at the point of contact of the jaws on one side with the jaws on the other side, whereby a substantially continuous gripping face is maintained in all adjustments of the jaws. It will be observed that the jaws on the two sides of the machine are independently adjustable so that they can be adapted to fit crooked lasts or lasts that have more swing on the right side of a right last and the left side of a left last than upon the opposite sides. The adjusting mechanism is so arranged that the jaws can be adjusted if desired after a shoe has been gripped.

The wipers 80 which represent, in the illustrated embodiment of the invention, the preferred means for forcing the upper into lasted position after it has been pulled over and adjusted upon the last are mounted in guideways in the front face of the machine head to which they are held by stud and slot connections 82, as indicated in Fig. 1. The wipers are connected by links 84 to an equalizing bar 85 pivoted on a block 86 that can slide vertically in the guideway 87 in the cap of the machine. The block is connected to a lever 90 provided with a spring pawl 89 adapted for engagement with a ratchet bar on the side of the cap for holding the lever and wipers in the positions to which they are moved and more particularly for maintaining the wipers in their raised position. The wipers have edge plates 81 which may be removably attached to the body portion of the wiper as shown in Fig. 18 so that they can be readily removed and replaced by others of different shape. In another construction shown in Fig. 20 the front plates 77, in which are located the slots of the pin and slot connections 82, are pivoted together at 79 at a point substantially concentric with the center of movement of the wipers and are connected to the head 2 by pin and curved slot connections at 811 the slots being formed concentric with the pivot 79. A screw 83 connects each of the plates 77 with the head, whereby said plates may be separately adjusted for positioning the wipers initially and independently of their operation by the hand lever 90. By this arrangement the wipers can be adjusted for shoes of different widths and can also be adjusted readily for right and left crooked lasts in the same manner as the grippers. The screws 83 have handle pins to facilitate their manipulation and enable the operator to adjust the wipers conveniently even after a shoe is in the machine and without the use of any machine tools. The wipers are actuated while the upper is held under tension by the jaws 40, 41, and in its normal, outwardly flaring position where, as above stated, it is stretched without the formation of wrinkles. As the wipers close against the taut upper they force the upper over the edge of the last and innersole, as indicated in Figs. 8 and 9 and in Fig. 13, to the position in which it is shown in Fig. 10. In a shoe having a lip or shoulder on the face of the innersole, as in welt and turn shoes, the upper will be forced by the wipers into the angle between said lip or shoulder and the relatively thin feather edge of the innersole into position to be sewn to the lip or shoulder. As may be observed from Fig. 9, the wiper moves between the stationary jaw 40 of the grippers and the cover plate of the machine head and is braced by said stationary jaw to resist the pressure exerted on the last by the toe clamp. This arrangement insures that the wiper may be sufficiently rigid without making it of too great thickness to permit it to work advantageously between the grippers and the last. If the wiper were of greater thickness a greater length of upper material would be required in order that the upper should be securely seized by the grippers. The provision above described for adjusting the wiper plates permits them to be positioned so that they will seat the upper accurately into the angle between the lip and feather on shoes varying in width or shape and by adjusting the wiper plate on one side of the machine with relation to that on the other side the wipers may very quickly adapt themselves to the shape of right and left crooked lasts. While the wipers are closing the upper may be allowed to pull under tension from between the jaws of the grippers, which will be slightly released for this purpose, or the bottom rest may be gradually retracted so as to let the last approach the plane of the wipers to provide the length of upper required for bending it into lasted position over the innersole, or the necessary slack may be obtained both by retracting the abutment and by permitting the upper to pull from the grippers. In any case the upper is maintained under tension until it has become clamped between the wipers and the edge of the last and there is no opportunity offered during the pulling and lasting operation for the formation of wrinkles in portion of the upper that will be visible in the finished shoe. In the illustrated machine the operator manipulates the wipers manually as well as the bottom rest and the grippers so that the procedure may be varied and be suited to the conditions presented at different times and by different kinds of work. For example, if the upper is a short one it will usually be best to retract the bottom rest until the wiper clamps the upper rather than to allow the upper to pull from the grippers. The arrangement which permits the last to be rocked and rolled relatively to the bottom rest and to the wipers enables the operator to position lasts of different shapes with their bottom faces in operative relation to the plane of the wipers. In Fig. 7 the dotted lines indicate a rocking movement of the last by which the toe end is placed outside the plane of the wipers.

In making shoes on some styles of lasts, particularly those which have a deep concave on their top face over the ball of the foot, one of the most difficult portions to fit properly to the last and work snugly into lasted position is the portion extending over the said concave part of the last. It is particularly difficult to wipe this portion into lasted position without permitting it to slip back. For the purpose of overcoming this difficulty the wipers are herein shown as provided with side clamps 92 yieldingly mounted and normally held in position to clamp the upper against the side and edge of the last at about the toe tip seam for holding the upper from slipping back while it is being wiped into position at this point. These side clamps yield backwardly with relation to the wipers as the latter advance so that the holding force of the clamps is increased as the grippers release the upper. It is contemplated that a binder of continuous material will be employed for holding the upper in lasted position about the forward portion of the last and in order to fasten the upper with increased security at the ball of the last where it is most likely to slip back anchor tacks for the binder and also preferably one or more other tacks are inserted at each side of the ball in the region of the side clamps. The tack-inserting mechanism will be described later.

Provision for further conforming the upper to the concave portion of the last over the ball of the foot is found in a toe rest or clamp 100 which may comprise a relatively large block of yielding material, such as rubber, adapted to engage the top face of the shoe and be forced against the shoe for pressing the upper into the concave of the last and clamping it firmly against the last after the upper has been partially or completely pulled. The toe rest occupies during the pulling-over and adjusting operations an inoperative relation where it does not obstruct the view of the shoe,—as for example, the dotted-line position shown in Fig. 1. The clamp is mounted on a bent shank 102 by which the movement from inoperative to operative position may be effected. For convenience the shank 102 has operative connection with the lever 90 through which the wipers are actuated. This connection is formed by a lever 104 connected at its upper end by a pin and slot with the lever 90 and at its lower end formed with teeth to engage a pinion 105 which is keyed to the shank 102. The pin and slot connection between the levers 104 and 90 permits the toe rest or clamp to be moved into operative position by a partial downward movement of the wipers so that if desired the clamp may be moved into operative position before the wipers force the upper over the last bottom or come into a position to interfere with further adjusting and pulling of the upper. The said pin and slot connection permits the wipers to be further advanced for forcing the upper into lasted position without necessarily disturbing the position of the toe rest. For backing the rest up to clamp the shoe the shank has a coarse screw thread, shown best in Fig. 11, which is engaged by a sprocket wheel 106 that is located between collars on the head 2 so that it can have no movement lengthwise of the shank 102 but compels the wheel to project the shank endwise when the wheel is rotated. For turning the wheel a suitably formed endless chain 108 is provided which extends within convenient reach of the operator, as shown in Fig. 1. This arrangement gives sufficient speed and power to enable the operator to force the rest back quickly and firmly for forcing the upper into the concave of the last face and clamping it against the last and the last in turn against the abutment 60. Other purposes served by the toe rest 100 are that of holding the last against forward displacement by the wipers as the latter crowd the upper inwardly over the innersole and that of forcing the last backwardly against the wipers after the latter have wiped the upper into lasted position. By thus forcing the last against the wipers the overlaid upper material may be firmly clamped and crimped into lasted position and any inequalities or irregularities in the portion of the upper overlying the feather of the innersole and between the lip and the edge of the shoe are well pressed out so that this portion of the upper is smooth and even and a well-defined edge is formed on the surface of the upper at the edge of the shoe.

The tack-driving mechanism heretofore briefly referred to is shown as comprising means for inserting four tacks, two being located on each side of the forward portion of the shoe and adapted to serve not only to fasten the upper at points of the greatest strain, but as anchor tacks for a binder by which the toe portion of the upper is held. Obviously a larger number of tacks might be driven and distributed about the entire forward portion of the shoe to secure the upper by tacks alone. The tack holders or nozzle 120 project from a tack block 122 that is shown best in Figs. 2 and 16 and receives a driver head 124 having driver bars 125. The driver head is engaged by the lever 126, see Fig. 2, on the hub of which is a coil spring 128 through which power is derived to insert the tacks. The lever 126 has a handle 130 to actuate it for compressing the driver spring 128 and a latch 132 for holding the lever forward with the spring under tension.

In order that the nozzles 120 may occupy during the pulling-over and lasting operations a retracted position where they will be out of the way of the parts employed during those operations the entire tack block 122 is arranged for movement toward and from the plane of the shoe bottom. To this end the tack block has tongue and groove connection with a plate 123 which in turn has a tongue and groove connection with the head of the machine. This latter connection permits a movement of the tacking mechanism transversely of the machine which will later be referred to. The driver head is yieldingly connected to the tack block through a cross bolt 135 and a spring 136 located in a slot in the head, as shown in Figs. 16 and 17. The tack block also has connection with an angle lever 150 fulcrumed at 152 and connected by a link 154 and a rod 155 with a treadle 156. A swinging arm 157 is connected to the head of the rod 155 to be actuated thereby for engaging the tail of the latch 132 and swinging that latch away from the driver 126 to release that lever and permit the insertion of tacks to take place. After the tacks have been driven the operator, by means of the handle 130, turns the lever 126 for setting the driver spring and a spring 159 acting on the rod 155 raises that rod and the parts connected with it to turn the swinging arm 157 out of the path of the latch 132, which is actuated by a suitable spring into position to lock the driver lever 126. It is important to locate the tacks always in substantially the same relation to the edge of the shoe and for accommodating shoes of different widths there is an adjustable connection between the tack block 122 and the lever 150 by means of which the tacking mechanism may be shifted transversely of the machine, the block 123 sliding in the machine head. This adjustable connection is formed by a screw 140 confined by suitable collars against lengthwise movement in the lever and having threaded connection with the tack block as shown best in Fig. 16. The head of the lever 126 is wide enough so that the lever maintains engagement with the driver head 124 in its different adjustments. The two driver levers 126 for the two sides of the machine are fast on the same shaft 127 so that both levers are set together by the handle 130 and are released together by withdrawing the pawl or latch 132. The tacks are supplied by strips 170 which are automatically fed through the guides 172 into the path of the drivers by ratchet bars 174 that engage the stems of the tacks close to the strip. The ratchet bars are carried on a block 175 that is movable on the guides 172, being pressed inwardly by the spring 176 that surrounds a rod 178 and being pressed outwardly by the engagement of the end of said rod by an inclined face 179 on the driver head. It will of course be understood that the tacking mechanisms on the two sides of the machine are alike except that both are connected with a single lever 126 and the single treadle 156. The driver tubes are shown as provided with holders 190 that are adapted to receive a strand of binding material and hold it in position to be fastened to the shoe by the anchor tack as the latter is driven. The binding material may be a wire having a loop formed therein which may be located by the operator and supported by the holders 190 in such relation to the driver passage that the tack will be driven through the loop in the wire. The binder may also be a strand of tape or the like which will be supported across the end of the tube, as in Fig. 16, in position to have the tack driven through it. After the tacks have been inserted the strand of binding material thus anchored at one end to the shoe may be passed by the operator around the toe of the shoe to the opposite side and as the toe clamp is retracted slightly the binder may be drawn into holding position and then the shoe completely released from the machine, after which the operator may fasten the binder to the anchor tacks on the second side of the machine, or in case tape is used, he may insert manually a tack through the tape on the second side of the shoe to fasten it.

The operation of the machine, which has been largely explained in connection with the description of the several mechanisms, may be briefly restated to present it in a connected manner. The shoe may be prepared for the operation of the machine by applying an innersole to the last bottom where it will preferably be fastened by one or more tacks, as is customary. The upper is then loosely applied to the last, the fore part of the upper presenting with relation to the sides of the last substantially the appearance shown in Fig. 5. The shoe is then rested upon the heel support 32, the latter being shifted if necessary laterally, vertically, or forwardly to adapt its position for the size and the shape of the last upon which the particular shoe is to be made, it being understood that the position of the pulling-over and lasting instrumentalities is constant in the machine. The grippers may be adjusted if necessary by the shafts 72 to adapt them to the width and the shape of the particular shoe to be operated upon and likewise the wiper plates may be adjusted in accordance with the shape of the shoe in the machine and for considerable variations in the width of the shoe the tacking mechanisms may be shifted inwardly or outwardly by the adjusting devices 140. In presenting the shoe the outwardly flaring edges of the forward portion of the upper are thrust within the open jaws of the grippers in somewhat the manner suggested by Fig. 11. The formation of the jaws is well adapted for the reception of the upper in its normal outstanding relation to the sides of the last. The grippers are then closed by their operating treadle and locked by the pawl 55. The abutment or bottom rest 60 is then advanced by its treadle to force the last outwardly from the machine for stretching the upper. The grippers are formed, as will be understood from the several views, on a larger curvature than that of the last so that the upper is pulled obliquely away from the sides of the last, being stretched over the top face of the last to the contour of which it is thus conformed with a minimum frictional resistance to the pulling strain. The formation of the grippers to receive and hold the upper in its normal outstanding relation to the last enables the upper to be gripped and also to be pulled without crimping or folding it so that no wrinkles are formed while the upper is being pulled. It is also to be noted that the entire forward portion of the upper is pulled simultaneously, the grippers as shown having substantially continuous gripping faces extending about the forward portion of the shoe. The continuous gripping faces and the oblique pulling of the upper insure a uniform and simultaneous straining of the several portions of the upper over the last so that unequal tensions on adjacent portions of the upper tending to produce wrinkles are avoided. During or after the pulling of the upper the last may be shifted within the upper as has been described to any extent that may be required for properly positioning the upper on the last with the several lines, as the toe tip seam and the lace opening, in correct relation to the last. It will be observed that the arrangement is such that the abutment may be retracted more or less for relaxing the tension on the upper to permit the last to be easily adjusted within the upper or to be adjusted without such frictional engagement with the upper as would interfere with the relative movement which it may be desirable to effect between the upper and the last. The toe rest or clamp 100 is brought into position over the top face of the forward portion of the last by the lever 90 and then forced backwardly to clamp the upper against the top of the last, forcing it into the concave over the last ball. The upper having been pulled and adjusted into proper pulled-over position the wipers may be advanced to inclose the line of upper extending between the grippers and the last and by their continuous acting edge bend the upper inwardly over the last bottom without offering opportunity for the formation of wrinkles between the last and the wipers. The abutment may be retracted to permit the last to be drawn rearwardly by the action of the wipers and the grippers may be caused to relax their hold on the upper so that it may slip between them. The side clamps 92 come into holding engagement with the upper at the ball of the shoe before the upper is released and hold it at this point from slipping back. The toe rest or clamp may now be actuated to force the last backwardly against the wipers to form or mold the upper against the last bottom and set it in its lasted position. On account of the conditions under which the entire forward portion of the upper is simultaneously stretched in pulling it over and is then wiped into lasted position without opportunity for the formation of any wrinkles, and the described provision for compressing or conforming the marginal portion of the upper against the innersole in its lasted position, the upper is well molded to the contour of the last and conditions are most favorable for it to retain that shape after the shoe is completed. When the upper has been forced into satisfactory lasted position the wipers will be slightly retracted to permit the tacks to be driven and the treadle 156 will be depressed for first bringing the tack holders or nozzles 120 up to the last bottom and then tripping the latch 132 for causing the drivers to be actuated for inserting the tacks. If desired, the end of the binder may be placed in the holder 190 at one side of the machine to be anchored at that time by the tacks as they are driven. The binder may then be passed around the shoe and held under tension until the shoe has been taken from the machine, after which it may be fastened to one of the tacks on the other side of the shoe.

From the foregoing description of the illustrated machine and its operation the following important observations are to be noted; that the grippers constitute upper holding means over one member of which the margin of the toe portion of the upper which is to be lasted-in over the shoe bottom can be outspread in smooth unwrinkled condition; that the other member grips, that is, engages and holds by pressure, the margin in this smooth condition and said members maintain it smooth during the upper stretching and the overwiping operations of the machine; that the wipers are separate from the upper gripping members and move to carry the upper inwardly to lasted position while the margin or edge of the upper is maintained outspread in unwrinkled condition by the gripping members; that therefore the gripping members prevent the closing action of the wipers from "fulling" the upper and forming wrinkles in it as the upper is laid over the edge of the shoe bottom.

It has heretofore been proposed to hold the upper against the wipers by a "retarder". In the use of such a combination, in which the lower member of the holder is formed by the closing wipers, the upper is fulled by the movement of the wipers instead of being maintained in its outspread condition and the smooth lasting obtained by this invention cannot be secured. A particular advantage gained by the present invention is that the upper holding jaws, which are preferably independent of the toe wipers, prevent the upper at the sides of the toe from being carried backwardly toward the heel by the backward swinging of the wipers in their curvilinear movement, thus preventing the fullness frequently found at the extreme ends of the toe wipers, and if the upper holding jaws do not close with the wipers over the sides of the toe said jaws will produce tighter stretching of the upper under the extreme rear portions of the wipers than heretofore has been obtained.

In the provision and arrangement of upper holding members and wipers to secure the above mentioned results in lasting the toe portion of the upper without wrinkles is to be recognized important features of this invention.

Having explained the nature of this invention and described a construction embodying it in the best form now known to me, I claim as new and desire to secure by Letters Patent of the United States:—

1. A machine for working an upper over a last having in combination, means for pulling-over the shoe including means permitting relative adjustment of the upper and last, and means for lasting the shoe while the shoe remains the same side up in the machine as at the end of the pulling-over operation.

2. A machine for working an upper over a last having, in combination, mechanism for gripping the upper of the forward portion of the shoe and pulling-over the shoe, including means permitting relative adjustment of the upper and last, means for lasting the upper from a point on one side of the toe around the toe to a point on the other side of the toe, and means for inserting fastenings to secure the upper in pulled and lasted position.

3. A machine for working an upper over a last with an innersole on its bottom face having, in combination, means for pulling-over the shoe, including means permitting relative adjustment of the upper and last, means for lasting a continuous section of the fore part of the shoe, and means for securing the lasted upper to the innersole.

4. A machine for working an upper over a last having, in combination, means for pulling-over the shoe including means permitting relative adjustment of the upper and last, and means for lasting a continuous section of the upper extending completely around the toe of the shoe, said machine being constructed and arranged to permit the operator to have a substantially unobstructed view of the top face of the shoe during the operation of the pulling and lasting means thereon.

5. A machine for working an upper over a last arranged to support the shoe in upright position with the top face of the shoe toward the operator and having, in combination, means for pulling-over the shoe, and wipers arranged to act upon the pulled upper while the upper is held under tension by the pulling-over means to force the upper into lasted position upon the last bottom.

6. A machine for working an upper over a last having, in combination, means for gripping the forward portion of the upper and pulling it on the last including means permitting relative adjustment of the upper and last, wipers, and means for actuating the wipers to work a continuous section of the upper extending around the toe into lasted position while the shoe remains in the position that it occupied at the end of the pulling-over operation.

7. A machine for working an upper over a last having, in combination, means for gripping the forward portion of the upper and pulling it over the last, wipers, and means for actuating the wipers to work the upper into lasted position, said machine having provision for relatively moving the wipers and the last perpendicularly to the plane of the last bottom to clamp the upper against the last bottom during the lasting operation.

8. A machine for use in the manufacture of boots and shoes having, in combination, means for pulling an upper over a last arranged to permit relative adjustment of the last and the pulled upper, and means for working a continuous section of the upper extending around the toe into lasted position.

9. A machine for working an upper over a last having, in combination, gripping means constructed and arranged to receive at the toe end and at the opposite sides a substantial distance from the toe end of a shoe the upper in its normal outwardly flared position relatively to the forward portion of the last and pull the upper on the last, and independently actuated means for lasting the upper.

10. A machine for working an upper over a last having, in combination, gripping means provided with substantially continuous gripping faces flared outwardly to seize the upper at the toe end and for a substantial distance along the opposite sides of the shoe in its normal outwardly flared position and pull it over the last, and independently actuated means for lasting the upper of the forward portion of the shoe.

11. A machine for working an upper over a last having, in combination, gripping means provided with substantially continuous gripping faces formed and arranged to receive in its normal, outwardly flared position the marginal portion of the upper at the end and for a substantial distance along the sides of the forward portion of the shoe and to pull the upper on the last, and independently actuated wipers arranged to embrace the forward portion of the shoe and force the upper into lasted position.

12. A machine for working an upper over a last having, in combination, gripping means, an abutment for the last, means for actuating said abutment and gripping means relatively to pull the upper over the last, and means for forcing the pulled upper into lasted position, said machine having provisions for relaxing the pulling tension on the pulled upper at the toe and at both sides of the last simultaneously and for relatively moving the upper and last to adjust the upper while the tension is relaxed.

13. A machine for working an upper over a last having, in combination, means for pulling an upper over the last and means for working the pulled-over upper into lasted position, said machine being arranged to permit relative adjustment of the last and the pulled upper and having provision for relaxing the tension on the pulled upper at the toe and at both sides of the last simultaneously while the adjustment is being made.

14. A machine of the class described having, in combination, means for supporting a shoe with the toe uppermost in position to present to the operator a substantially unobstructed view of the upper on the top face and the sides of the last, means for pulling over the shoe, and means for forcing the pulled over upper into lasted position while the shoe remains in substantially the same position.

15. A machine of the class described having, in combination, means for supporting a shoe in substantially upright position with the toe uppermost in position to present to the operator a substantially unobstructed view of the upper on the top face and the sides of the last, means for pulling the upper over the last, and means for driving tacks in position to fasten the upper.

16. A machine of the class described having, in combination, means for supporting a shoe in substantially upright position with the toe uppermost in position to present to the operator a substantially unobstructed view of the upper on the top face and the sides of the last, means for pulling the upper over the last, means for actuating the last and the pulling means relatively to adjust the upper upon the last, and means for fastening the upper.

17. A machine of the class described, having, in combination, means for supporting a shoe in position to present to the operator a substantially unobstructed view of the upper on the top face and the sides of the last, means for pulling the upper over the last, means for actuating the last and the pulling means relatively to adjust the upper upon the last, and means for lasting the pulled and adjusted upper.

18. A machine of the class described having, in combination, means for supporting a shoe in position to present to the operator a substantially unobstructed view of the upper on the top face and the sides of the last, and means for pulling the upper over the last, said supporting means including a member that is arranged for movement in one direction to effect the pulling of the upper and a member that is movable in a different direction to effect adjustment of the last in the pulled upper.

19. A machine of the class described having, in combination, means for supporting a shoe with the toe in upright position, grippers for pulling the upper constructed with substantially continuous gripping faces arranged to receive the marginal edge of the upper at the end and opposite sides of the shoe, and means for forcing the upper into lasted position.

20. A machine of the class described having, in combination, means for supporting a shoe in upright position, grippers for pulling the upper constructed with substantially continuous gripping faces arranged to receive the marginal edge of the upper at the end and opposite sides of the shoe, means for relatively actuating the grippers and support to pull the upper, means for forcing the upper into lasted position, and means for inserting fastenings to secure the upper.

21. A machine for use in the manufacture of boots and shoes having, in combination, means for pulling an upper over a last arranged to permit relative adjustment of the last and the pulled upper transversely of the last, and means for working the upper into lasted position.

22. A machine for use in the manufacture of boots and shoes having, in combination, means for pulling an upper over a last, and means for working the upper into lasted position, said machine being constructed and arranged to permit relative adjustment of the last and the pulled upper longitudinally of the last between the pulling and the lasting operations.

23. A machine for use in the manufacture of boots and shoes having, in combination, means for pulling an upper over a last and having provision for moving the last within the pulled upper to effect relative adjustment of the last and upper, and means for working the upper into lasted position.

24. A machine of the class described having, in combination, means for gripping the upper at the end and the opposite sides of the forward portion of a last, an abutment for the last bottom, means for relatively actuating the gripping means and the abutment to pull the upper, said machine being constructed and arranged to permit movement of the last upon the abutment as a fulcrum to adjust it within the pulled upper, and means for inserting tacks at the opposite sides of the shoe to secure the upper.

25. A machine of the class described having, in combination, means for gripping the upper at the end and the opposite sides of the forward portion of a last, an abutment for the last bottom, means for relatively actuating the gripping means and the abutment to pull the upper, said machine being constructed and arranged to permit movement of the last upon the abutment as a fulcrum to adjust it within the pulled upper, and means for working the upper into lasted position.

26. A machine of the class described having, in combination, means for gripping the upper at the end and the opposite sides of the forward portion of a last, an abutment for the last bottom, and means for relatively actuating the gripping means and the abutment to pull the upper, said pulling means being constructed and arranged to pull the upper at the sides and the end of the last outwardly at an oblique angle to the plane of the last bottom.

27. A machine for working an upper over a last having, in combination, gripping means constructed and arranged to receive in its normal, outwardly flared position the marginal portion of the upper at the end and sides of the forward portion of the shoe, an abutment for the.last bottom, and means for relatively actuating the grippers and the abutment in a plane substantially perpendicular to the last bottom to stretch the upper.

28. A machine for working an upper over a last having, in combination, gripping means constructed with substantially continuous gripping faces and arranged to receive in its normal, outwardly flared position the marginal portion of the upper at the end and sides of the forward portion of the shoe, an abutment for the last bottom, and means for relatively actuating the grippers and the abutment in a plane substantially perpendicular to the last bottom.

29. A machine for working an upper over a last having, in combination, gripping means constructed and arranged to receive in its normal, outwardly flared position the marginal portion of the upper at the end and sides of the forward portion of the shoe, an abutment for the last bottom, and means for relatively actuating the grippers and the abutment to stretch the upper, said machine having provision for further relative movement of the last and the grippers to adjust the upper about the last.

30. A machine for working an upper over a last having, in combination, gripping means located at the sides and the toe end of the shoe constructed and arranged to receive in its normal, outwardly flared position the marginal portion of the upper placed loosely upon the last, an abutment for the last bottom, and means for relatively actuating the grippers and the abutment to stretch the upper over the last, said machine having provision for permitting relative movement of said grippers and the last to adjust the upper upon the last.

31. A machine for working an upper over a last having, in combination, gripping means located at the sides and the toe end of the shoe constructed and arranged to receive in its normal, outwardly flared position the marginal portion of the upper placed loosely upon the last, an abutment for the last bottom, and means for relatively actuating the grippers and the abutment to stretch the upper over the last, a rest for the heel of the last movable manually while the upper is under tension, and means for locking the rest.

32. A machine for working an upper over a last having, in combination, means for gripping the upper at opposite sides of the forward portion of the last, and means, including an abutment for the last, for relatively moving the grippers and last to pull the upper, said machine having provision for permitting movement of the last sidewise relatively to the gripped upper.

33. A machine for working an upper over a last having, in combination, means for gripping an upper at opposite sides of the forward portion of the last, and means, including an abutment for the last, for relatively moving the grippers and last to pull the upper, said machine having provision for permitting movement of the last about a center in the forward portion of the last to adjust the last and upper relatively.

34. A machine for working an upper over a last having, in combination, means for gripping the upper at opposite sides of the forward portion of the last, and means for relatively moving the grippers and last to pull the upper, said machine including an abutment for the last about which the last may be turned to adjust the last and upper relatively.

35. A machine for working an upper over a last having, in combination, means for gripping the upper at opposite sides of the forward portion of the last, and means, including an abutment for the last, for relatively moving the gripping means and last to pull the upper, said machine having provision for permitting turning movement of the last relatively to the gripped upper about an axis extending longitudinally of the shoe.

36. A machine for working an upper over a last having, in combination, means for gripping an upper at opposite sides of the forward portion of the last, and means, including an abutment for the last, for relatively moving the grippers and last to pull the upper, said machine having provision for permitting movement of the last relatively to the gripped upper about an axis extending transversely across the last bottom.

37. A machine for working an upper over a last having, in combination, means for gripping an upper at opposite sides of the forward portion of the last, means for relatively moving the grippers and last to pull the upper, a heel rest, means for actuating the heel rest to adjust the last longitudinally in the pulled upper, and means for forcing the upper into lasted position about the forward portion of the last.

38. A machine for working an upper over a last having, in combination, means for gripping the upper at opposite sides of the forward portion of the last, an abutment for the last, means for relatively actuating the abutment and gripping means to pull the upper, said last being free to be turned laterally about said abutment for adjusting the last relatively to the gripped upper.

39. A machine for working an upper over a last having, in combination, an abutment for the last, gripping means constructed and arranged for engaging the upper at opposite sides of the forward portion of a last and holding the upper laterally away from the side faces of the last, and means for relatively actuating the gripping means and abutment to pull the upper, the machine being constructed and arranged to permit the last to be swung laterally about said abutment as a center.

40. A machine for working an upper over a last having, in combination, grippers constructed and arranged to engage the upper at the end and at opposite sides of the last, an abutment for the bottom of the last about which the last may be rocked forwardly and backwardly to vary the pull on the upper at the end of the last, and means for relatively moving the grippers and abutment substantially perpendicularly to the last bottom for pulling the upper.

41. A machine for working an upper over a last having, in combination, grippers constructed and arranged to engage the upper at the end and at opposite sides of the last, an abutment engaging the bottom of the last, and means for relatively moving the grippers and last for pulling the upper, said machine being constructed and arranged to permit movement of the shoe relatively to the abutment about an axis extending longitudinally of the last.

42. A machine for working an upper over a last having, in combination, gripping means constructed and arranged to receive in its normal, outwardly flared position the marginal portion of the upper at the end and sides of the forward portion of the shoe, an abutment for the last bottom, means for relatively actuating the grippers and the abutment to stretch the upper, and means for thereafter forcing the upper into lasted position over the last bottom.

43. A machine for working an upper over a last having, in combination, gripping means constructed and arranged to receive in its normal, outwardly flared position the marginal portion of the upper at the end and sides of the forward portion of the shoe, an abutment for the last bottom, means for relatively actuating the grippers and the abutment to pull the upper, and means presenting a substantially continuous acting edge to engage the outwardly stretched upper and force it inwardly to lasted position upon the last bottom.

44. A machine for working an upper over a last having, in combination, gripping means constructed and arranged to receive in its normal, outwardly flared position the marginal portion of the upper at the end and sides of the forward portion of the shoe, an abutment for the last bottom, means for relatively actuating the grippers and the abutment in a plane substantially perpendicular to the last bottom, and wipers for forcing the upper inwardly to and over the edge of the last.

45. A machine for working an upper over a last having, in combination, gripping means constructed and arranged to receive in its normal, outwardly flared position the marginal portion of the upper at the end and sides of the forward portion of the shoe, an abutment for the last bottom, means for relatively actuating the grippers and the abutment to stretch the upper, and means for forcing the upper inwardly to lasted position upon the last bottom, said stretching instrumentalities being constructed and arranged to maintain the upper under tension until it is clamped to the last bottom.

46. A machine for working an upper over a last having, in combination, gripping means constructed and arranged to receive in its normal, outwardly flared position the marginal portion of the upper at the end and sides of the forward portion of the shoe, an abutment for the last bottom, and means for relatively actuating the grippers and the abutment in a plane substantially perpendicular to the last bottom to stretch the upper, said machine having provision for thereafter forcing the outwardly stretched upper inwardly to and over the edge of the last into lasted position while maintaining it under tension.

47. A machine for working an upper over a last having, in combination, gripping means constructed and arranged to receive in its normal, outwardly flared position the marginal portion of the upper at the end and sides of the forward portion of the shoe, an abutment for the last bottom, and means for relatively actuating the grippers and the abutment to stretch the upper, said machine having provision for relative movement of the last and the grippers to adjust the upper, and means for forcing the upper into lasted position.

48. A machine for working an upper over a last having, in combination, gripping means constructed and arranged to receive in outwardly extending position the marginal portion of the upper at the end and sides of the forward portion of the shoe, an abutment for the last bottom, means for relatively actuating the grippers and the abutment to stretch the upper, and means for forcing the upper into lasted position.

49. A machine for working an upper over a last having, in combination, gripping means located at the sides and the toe end of the shoe constructed and arranged to receive in its normal, outwardly flared position the marginal portion of the upper placed loosely upon the last, an abutment for the last bottom, and means for relatively actuating the grippers and the abutment to stretch the upper over the last, said machine being constructed and arranged to permit the last to be moved upon the abutment as a fulcrum to shift it within the upper while the latter is held by the grippers.

50. A machine for working an upper over a last having, in combination, gripping means located at the sides and the toe end of the shoe constructed and arranged to receive in its normal, outwardly flared position the marginal portion of the upper placed loosely upon the last, an abutment for the last bottom, and means for relatively actuating the grippers and the abutment to stretch the upper over the last, said machine being constructed and arranged to permit the last to be turned upon the abutment to vary the relative strains on different portions of the upper.

51. A machine for working an upper over a last having, in combination, gripping means located at the sides and the toe end of the shoe constructed and arranged to receive in its normal, outwardly flared position the marginal portion of the upper placed loosely upon the last, an abutment arranged to engage the bottom of the last at a substantial distance back from the end, and means for actuating the abutment to stretch the upper between the last and the grippers.

52. A machine for working an upper over a last having, in combination, gripping means located at the sides and the toe end of the shoe constructed and arranged to receive in its normal, outwardly flared position the marginal portion of the upper placed loosely upon the last, an abutment for the last bottom, and means for relatively actuating the grippers and the abutment to stretch the upper over the last, said machine having provision for further moving the last endwise relatively to the grippers.

53. A machine for working an upper over a last having, in combination, gripping means located at the sides and the toe end of the shoe constructed and arranged to receive in its normal, outwardly flared position the marginal portion of the upper placed loosely upon the last, an abutment for the last bottom, and means for relatively actuating the grippers and the abutment to stretch the upper over the last, a rest for the heel end of the last arranged for movement endwise of the last and also laterally thereof, and means for actuating the heel rest.

54. A machine for working an upper over a last having, in combination, grippers for seizing the upper, an abutment for the last bottom, means for actuating the abutment to effect the pulling of the upper, and wipers for forcing the upper into lasted position over the last bottom, said actuating means being arranged for movement under control of the workman to permit displacement of the last toward the grippers as the wipers bend the upper over the last bottom.

55. A machine of the class described, having, in combination, devices for pulling the upper at an oblique angle to the last bottom and for laying it into lasted position over the last bottom, an abutment for the last bottom, and means under control of the operator for actuating the abutment to effect a movement of the last from said devices during the pulling of the upper and for actuating the abutment toward said devices during the overlaying of the upper.

56. A machine for working an upper over a last having, in combination, means for engaging the upper, means for engaging the last, means for relatively actuating said engaging means to pull the upper about the last, said machine being constructed and arranged to permit the last to be adjusted in the pulled upper for positioning it with relation to the lines of the upper, and wipers for forcing the marginal portion of upper over into lasted position upon the last bottom.

57. A machine for working an upper over a last having, in combination, grippers formed with substantially continuous gripping faces to engage the upper from one side of the shoe around the toe to the other side of the last, means for closing the grippers, means for relatively actuating the grippers and last to stretch the upper, means to wipe the upper over the bottom of the last, and means for inserting fastenings to secure the upper.

58. A machine for pulling-over and lasting the forward portion of a shoe having, in combination, grippers constructed and arranged to have continuous engagement with the upper from one side of the forward portion of the last around the toe to the other side of the last, means for closing the grippers, means for relatively actuating the grippers and last to stretch the upper, wipers constructed and arranged to have continuous engagement with the upper about the forward portion of the last, and means for advancing the wipers relatively to the grippers and for closing the wipers to lay the upper over the last at the end and sides of the forward portion.

59. A machine for pulling-over and lasting the forward portion of a shoe having, in combination, grippers having a configuration corresponding to the outstanding edge portion of upper material at the forward portion of a last, means for closing the grippers, means for relatively moving the last and grippers substantially perpendicularly to the last bottom to stretch the upper, and means for laying the upper over the last bottom, said machine having provision for relative movement of the grippers and the last to adjust the upper upon the last between the pulling and the overlaying operations.

60. A machine of the class described having, in combination, pulling over means comprising grippers for engaging the upper at the toe end and at opposite sides of the last and arranged to pull the upper free from the side faces of the last, wipers for forcing the upper into lasted position, and shoe supporting means, including an abutment for the forepart of the shoe, which is arranged to permit the last to be rocked to aline the plane of the last bottom relatively to the plane of the wipers.

61. A machine for pulling-over and lasting a shoe having, in combination, curved grippers to engage the upper of the forward portion of a shoe, said grippers having a curvature of longer radius than the curvature of the forward portion of the last, means for closing the grippers, means for relatively moving the last and grippers substantially perpendicularly to the last bottom to stretch the upper, and means for laying the upper over the last bottom.

62. A machine for pulling-over and lasting a shoe having, in combination, grippers constructed and arranged to engage the upper at the sides and end of the forward portion of a shoe and having a configuration corresponding to the outstanding edge portion of an unlasted upper at the forward portion of the shoe, means for relatively moving the last and grippers to pull the upper upwardly and outwardly, wipers, and means for actuating them independently of the grippers to force the pulled upper over the last bottom simultaneously at the sides and end of the forward portion.

63. A machine for pulling-over and lasting a shoe having, in combination, grippers constructed and arranged to engage the upper of the forward portion of a shoe at the end and at the sides of the last, means for relatively moving the grippers and last to pull the upper in lines oblique to the side and end faces of the last, and means for laying the upper over the bottom of the last, said machine having provision for relative movement of the grippers and the last to adjust the upper between the pulling and overlaying operations.

64. A machine for pulling-over and lasting a shoe having, in combination, curved grippers constructed and arranged to engage the upper at the sides and end of the forward portion of a last and to pull the upper upwardly with relation to the bottom of the last and outwardly with relation to the side faces of the last, means for relatively moving the last and the grippers, wipers, and means to actuate the wipers longitudinally and transversely of the last to lay the upper over the innersole simultaneously at the sides and end of the forward portion of the last.

65. A machine for pulling-over and lasting a shoe having, in combination, grippers comprising an outer member longitudinally curved to extend around the forward portion of a last and formed to receive the edge of the upper material of the forward portion of the shoe in its normal outstanding position, an inner gripper member of similar shape, means for actuating the inner member to clamp the upper against the outer member, means for relatively actuating the last and the grippers to pull the upper, wipers constructed and arranged to embrace the upper between the grippers and last, and means for advancing and closing the wipers to lay the upper over the last bottom.

66. A machine for pulling-over and lasting a shoe having, in combination, grippers and actuating mechanism therefor, means for moving the last away from the grippers to stretch the upper, wipers for laying the upper over the bottom of the last, and a rest for the heel end of the last movable relatively to the wipers into and out of position to support the last against the pressure of the wipers.

67. A machine for pulling-over and lasting a shoe having, in combination, grippers and actuating mechanism therefor, means for moving the last away from the grippers to stretch the upper, wipers for laying the upper over the bottom of the last, a rest for the heel end of the last movable relatively to the wipers into and out of position to support the last against the pressure of the wipers, and means for holding the rest in an inoperative position.

68. A machine for pulling-over and lasting a shoe having, in combination, grippers, wipers, an abutment for the last, means for actuating the abutment to move the last away from the grippers and into operative relation to the wipers, means for actuating the wipers, and a heel rest arranged to be moved into position to support the last against the action of the wipers.

69. A machine for pulling-over and lasting a shoe having, in combination, means for pulling the upper over the last, wipers for laying the upper over the last bottom, a toe rest adapted to engage a top face of the shoe and movable in the plane of its resting face into and out of operative relation to the shoe, and means for actuating the rest substantially perpendicularly to said top face of the shoe for pressing the shoe rearwardly toward the wipers.

70. A machine of the class described having, in combination, manually operated mechanisms for working an upper over a last, and means under the control of the operator for inserting tacks simultaneously at opposite sides of the last.

71. A machine of the class described having, in combination, manually operated mechanisms for stretching an upper and laying it over a last, tack-inserting mechanisms having provision for automatically feeding tacks, and means under control of the operator for actuating the tacking mechanism to insert a plurality of tacks simultaneously at opposite sides of the last.

72. A machine of the class described having, in combination, means for working an upper over a last, and tack-driving mechanism which as a whole is automatically movable perpendicularly to the plane of the shoe bottom from a position out of the way of the overworking means into a position adjacent to the surface of the shoe bottom and means for actuating said mechanism to insert tacks.

73. A machine of the class described having, in combination, means for engaging the upper, means for engaging the last, means for actuating the latter to move the last for stretching the upper, and tack-driving mechanism including a tack guide movable substantially perpendicularly to the tack-receiving surface away therefrom to permit the shoe to be presented to said upper-engaging means and toward the tack-receiving surface to locate said guides in operative relation to the shoe after the upper has been pulled.

74. A machine of the class described having means for gripping and pulling an upper at opposite sides of a last and means permitting adjustment of the last and upper relatively to position the last in relation to the lines of the upper, combined with means for lasting the forward portion of the shoe.

75. A machine of the class described having, in combination, means for gripping and pulling an upper at opposite sides of a last, means whereby the last and the upper may be relatively adjusted after the upper is pulled, and means for lasting the upper at the forward portion of the shoe all while the shoe remains in substantially the same position.

76. A machine of the class described having, in combination, means for pulling an upper on a last, means for supporting the last arranged to permit the last to be shifted in the upper for varying its position with relation to the lines of the upper, and means for forcing the upper into lasted position about the forward portion of the last.

77. A machine of the class described having, in combination, means for pulling an upper on a last, means for supporting the last arranged to permit the last to be shifted in the upper for varying its position with relation to the lines of the upper, means for forcing the upper into lasted position about the forward portion of the last, and means for inserting tacks.

78. A machine of the class described having, in combination, means for engaging an upper, means for engaging a last, means for relatively actuating said two engaging means to pull the upper, said machine being constructed and arranged to permit the last to be moved for adjusting it in the pulled upper, means for lasting the upper over the forward portion of an innersole on the last bottom, and means for inserting tacks through the upper into the innersole.

79. A machine of the class described having, in combination, grippers formed to receive at the sides and end of the shoe the flaring edge of the forward portion of the upper loosely applied to a last, means for engaging the last, means for relatively actuating said two means to pull the upper, and means for forcing the said edge portion of the upper over the last bottom.

80. A machine of the class described having, in combination, grippers formed with outwardly inclined jaws and located to receive at the sides and end of a shoe the flaring edge of the forward portion of the upper loosely applied to a last, means for engaging the last, means for relatively actuating said two means to pull the upper, means for forcing the said edge portion of the upper over the last bottom, and means for inserting tacks to hold the upper.

81. A machine of the class described having, in combination, grippers for engaging the upper at opposite sides of the forward portion of the last and means for relatively moving the grippers and last to pull the upper perpendicularly to the last bottom, said machine being constructed and arranged to permit, for the purpose of relatively adjusting the last and upper, a movement of the last about a center located between the grippers while the upper is under strain.

82. A machine of the class described having, in combination, means for gripping an upper at opposite sides of the forward portion of the last, an abutment for the last bottom, and means for relatively moving the abutment and last substantially perpendicularly to the last bottom to pull the upper, said machine having provision for permitting, for the purpose of relative adjustment of the last and upper, turning movement of the last within the gripped upper about an axis extending londitudinally of the shoe while the upper is under strain.

83. In a machine of the class described, means for gripping an upper at opposite sides of the forward portion of a last, said gripping means comprising suitable supporting and operating mechanism and sectional gripper jaws formed to adapt them to the contour of the sides of the last.

84. In a machine of the class described, means for gripping an upper at the end and the opposite sides of the forward portion of a last, said gripping means comprising suitable supporting and operating mechanism and sectional gripper jaws formed to adapt them to the contour of the forward portion of the last.

85. In a machine of the class described, means constructed and arranged for substantially continuous gripping engagement with an upper from one side of a last around the toe end of the last to the other side, said gripping means comprising suitable supporting and operating mechanism and sectional gripper jaws having curved acting faces formed to adapt them to the contour of the sides and end portion of the last.

86. In a machine of the class described, means constructed and arranged for substantially continuous gripping engagement with an upper from one side of a last around the toe end of the last to the other side, said gripping means comprising suitable supporting and operating mechanism and sectional gripper jaws having curved acting faces formed to adapt them to the contour of the sides and end portion of the last, said jaws being adjustably connected to the supporting and actuating mechanism.

87. In a machine of the class described, means for gripping an upper at opposite sides of the forward portion of a last, said gripping means comprising suitable supporting and operating mechanism, and sectional gripper jaws formed to adapt them to the contour of the sides of the last, said jaws being adjustably connected to the supporting and actuating mechanism.

88. In a machine of the class described, grippers constructed and arranged to engage the upper at the sides and end portion of a shoe, said grippers comprising coöperating curved jaws having a configuration corresponding to the normal, outwardly flaring position at the sides and toe end of the shoe of the edge portion of the forward part of an upper applied loosely to a last.

89. A machine of the class described having, in combination, means for working an upper over a last, tack-driving mechanism comprising a tack guide and a driver movably supported to allow it to be positioned away from the shoe during the overworking operation, and operating mechanism for moving the guide lengthwise of the driver toward the work and then actuating the driver to insert a tack.

90. A machine for working an upper over a last having means for securing the upper comprising a tack guide and a driver normally occupying a retracted position away from the shoe bottom to permit the overworking operations to take place, and means for actuating the guide and the driver perpendicularly to the tack-receiving surface to position and drive the tack.

91. A machine of the class described having, in combination, means for working an upper over a last, tack-driving mechanism comprising a tack guide and a driver movably supported to allow it to be positioned away from the shoe during the overworking operation, operating mechanism for moving the guide lengthwise of the driver toward the work and then actuating the driver to insert a tack, and means for automatically retracting the tack guide.

92. A machine of the class described having, in combination, means for working an upper over a last, tack-driving mechanism comprising a tack guide and a driver movably supported to allow it to be positioned away from the shoe during the overworking operation, operating mechanism for moving the guide lengthwise of the driver toward the work and then actuating the driver to insert a tack, means for setting the driver, and means for retracting the tack guide automatically when the driver is set.

93. A machine of the class described having, in combination, means for working an upper over a last, fastening mechanism comprising drivers for inserting tacks simultaneously at opposite sides of the shoe, separate springs for actuating said drivers, and a single manually operated mechanism for setting the several driver springs.

94. A machine of the class described having, in combination, a single grippers mechanism constructed and arranged to receive the upper at the end and the opposite sides of the forward portion of a shoe and comprising a plurality of jaw sections presenting a substantially continuous gripping face for engaging each side of the upper, and which are supported for relative movement to adapt the grippers to shoes of different widths.

95. A machine of the class described having, in combination, grippers curved to receive the upper at the forward portion of a shoe and comprising a plurality of jaws for engaging each side of the upper, and means for adjusting the jaws to adapt the grippers to shoes of different shapes.

96. A machine of the class described having, in combination, grippers to receive the upper at the forward portion of a shoe and comprising a plurality of jaws curved from substantially the middle of the toe backwardly for engaging each side of the upper, and means for independently adjusting the jaws at the two sides of the shoe to adapt them to differences in the contours of crooked lasts.

97. A machine of the class described having, in combination, grippers constructed and arranged to receive the upper at the forward portion of a shoe and comprising a plurality of curved jaws for engaging each side of the upper, which are supported for independent movement of the jaws at the opposite sides of the shoe in directions to adapt the contour of the grippers to the shapes of different lasts.

98. A machine of the class described having, in combination, grippers constructed and arranged to receive the upper at the forward portion of a shoe and comprising a plurality of jaws for engaging each side of the upper and together forming a substantially continuous gripping member, said jaws being mounted for relative movement to adapt them to the contour of the forward portion of the shoe to be operated upon.

99. A machine of the class described having, in combination, grippers to receive the upper at the forward portion of a shoe and comprising a plurality of curved jaws for engaging each side of the upper and together form a substantially continuous gripping member, said jaws being mounted for relative movement to adapt them to the contour of the forward portion of the shoe to be operated upon, and means conveniently accessible to the operator for adjusting the jaws.

100. A machine of the class described having, in combination, curved grippers to receive the upper at the forward portion of a shoe and comprising a plurality of jaws for engaging each side of the upper, means for adjusting the jaws to adapt the grippers to shoes of different shapes, and means for locking the jaws.

101. A machine of the class described having, in combination, grippers having curved gripping edges formed in sections, and adjusting means for varying the contour presented by the gripping edges.

102. A machine of the class described having, in combination, grippers having curved sectional jaws to grip the upper at the end and the two sides of the toe portion of the shoe, and means for adjusting the sectional jaws at the two sides of the shoe about a single center.

103. A machine of the class described having, in combination, grippers having curved sectional jaws presenting substantially continuous gripping edges to grip an extended section of upper and mounted for angular movement to adapt the gripping edges to the contour of the portion of the shoe over which the upper is to be pulled by the grippers.

104. A machine of the class described having, in combination, grippers having curved jaws, and means for adjusting said jaws to vary the curvature.

105. A machine of the class described having, in combination, grippers having curved jaws with toothed outer faces, an adjusting device engaging said toothed faces, and means for effecting adjustment of said jaws through said device.

106. A machine of the class described having, in combination, grippers having curved jaws 40, 41, shafts 72 having operative engagement with the jaws, and locking devices 74.

107. A machine of the class described having, in combination, grippers having curved jaws, supports for the jaws with which the latter have pin and curved slot connection, means for adjusting said jaws in directions determined by said curved slots, and provision for locking the jaws.

108. A machine of the class described having, in combination, lasting devices shaped in substantial similarity to the edge contour of the forward portion of a shoe and formed in relatively movable sections, and means for angularly adjusting the sections of the lasting devices relatively for contours of shoes of different width or shape, said machine having provision for locking the lasting devices to maintain the adjustment.

109. A machine of the class described having, in combination, lasting devices shaped in substantial similarity to the edge contour of an end portion of a shoe and formed in relatively movable sections presenting a continuous operative edge, and means to move the sections independently for initially adjusting them to adapt the operative edge to variations in the shape of different shoes.

110. A machine of the class described, comprising means for gripping an upper at opposite sides of the forward portion of the last, and means for relatively moving the grippers and last to pull the upper, said machine having provision for permitting movement of the last sidewise relatively to the gripped upper.

111. A machine of the class described, comprising means for gripping an upper at opposite sides of the forward portion of the last, and means for relatively moving the grippers and last to pull the upper, said machine having provision for permitting movement of the last about a center in the forward portion of the last to adjust the last and upper relatively.

112. A machine of the class described, comprising means for gripping an upper at opposite sides of the forward portion of the last, and means for relatively moving the grippers and last to pull the upper, said machine including an abutment for the bottom of the last about which the last may be turned to adjust the last and upper relatively.

113. A machine of the class described, comprising means for gripping an upper at opposite sides of the forward portion of a last, and means for relatively moving the gripping means and last to pull the upper, said machine having provision for permitting turning movement of the last relatively to the gripped upper about an axis extending longitudinally of the shoe.

114. A machine of the class described, comprising means for gripping an upper at opposite sides of the forward portion of the last, and means for relatively moving the grippers and last to pull the upper, said machine having provision for permitting movement of the last relatively to the gripped upper about an axis extending transversely across the last bottom.

115. A machine of the class described having, in combination, end-lasting plates or wipers presenting a continuous acting edge to extend around a last end and arranged to turn about a single pivotal point, means for actuating said plates, and means for adjusting the plates with relation to their actuating mechanism.

116. A machine of the class described having, in combination, end-lasting plates or wipers shaped to adapt them to the contour of the end portion of a last and arranged to turn about a common axis, and means for actuating said plates, said machine having provision for effecting relative adjusting movement of the plates that act at opposite sides of the shoe to adapt them to lasts of different shapes.

117. A machine of the class described having, in combination, end-lasting plates or wipers shaped to adapt them to the contour of the end portion of a last and mounted to turn about a common pivotal point or axis, means for actuating said plates, and means for independently adjusting the plates that act at the opposite sides of the shoe.

118. A machine of the class described having, in combination, end-lasting wipers, plates for supporting the wipers, pin and curved slot connections between the wipers and plates, means for adjusting the wipers on the plates, and independent means for actuating the wipers to force the upper over the end and sides of the last.

119. A machine of the class described having, in combination, end-lasting wipers arranged to embrace an end portion of a last and to turn about a common pivotal point, plates for supporting the wipers, adjustable connections between the plates and wipers whereby the plates can be positioned for lasts of different contours, means for adjusting the wipers, and means for actuating the wipers.

120. A machine of the class described having, in combination, a last rest and lasting plates or wipers operatively connected for movement together in the same direction toward and from operative position.

121. A machine of the class described having, in combination, wipers for forcing an upper over the end portion of a last, a rest for the last, and manually controlled means for actuating the rest and the wipers together in the same direction.

122. A machine of the class described having, in combination, toe wipers, a toe rest, and connected mechanism for moving the rest in substantially the plane of its shoe resting face toward the shoe when the wipers are advanced over the shoe bottom.

123. A machine of the class described having, in combination, a toe rest adapted to occupy a position out of touch with the shoe, wipers for working the upper over the last, and connected mechanism for moving the rest into operative relation to the shoe when the wipers are advanced.

124. A machine of the class described having, in combination, a toe rest adapted to occupy a position out of touch with the shoe, means for moving the rest into operative relation to the shoe, and other manually controlled means for actuating the rest perpendicularly to the shoe bottom.

125. A machine of the class described having, in combination, means for supporting a shoe in an upright position, wipers arranged for movement downwardly to work the upper over the last, a toe rest movable downwardly into position in front of the shoe, and means for actuating the rest to force the shoe backward against the wipers.

126. A machine of the class described having, in combination, a toe rest having a bent shank by which it is swung from and toward operative position, a pinion keyed to the shank, and a rack for engaging the pinion to swing the rest, a worm formed on the shank, a sprocket wheel mounted on the worm, and a chain on the sprocket wheel to move the shank endwise for actuating the rest from and toward the shoe.

127. A machine of the class described having, in combination, means for working an upper over a last, and means for securing the upper comprising a tack tube and a driver for inserting an anchor tack and means carried by the tack tube to hold a binder in position to cause the tack to anchor the binder to the shoe.

128. A machine of the class described having, in combination, means for working an upper over a last, and means for securing the upper comprising a tack tube and a driver for inserting an anchor tack, and means carried by the tube for holding the binder at two points and positioning an intermediate portion of the binder in the path of the tack whereby the binder is anchored at one end to the shoe.

129. A machine of the class described having, in combination, grippers comprising a stationary jaw mounted on a rigid frame and a movable jaw, and a wiper movable between an unyielding portion of said frame and said stationary jaw and supported by the latter.

130. A machine of the class described having, in combination, grippers comprising a stationary jaw mounted on a rigid frame and a wiper movable between an unyielding portion of the frame and said stationary jaw for working the upper over the last bottom, and means for pressing the last against the wiper, said stationary jaw serving to brace the wiper against the last during said pressure.

131. Means for gripping substantially the entire forward portion of the upper at its edge from one side around the toe to the other side and pulling said forward portion of the upper, and means having a substantially continuous wiping edge for forcing said forward portion of the upper over the last bottom into lasted position.

132. A machine of the class described, having, in combination, means for gripping substantially the entire forward portion of the upper at its edge from one side around the toe to the other side and pulling said forward portion of the upper, wipers having a substantially continuous wiping edge for forcing said forward portion of the upper over the last bottom into lasted position, and means for relatively moving the last and wipers perpendicularly to the last bottom for conforming the upper between the wipers and the last.

133. A machine of the class described, having, in combination, means for gripping substantially the entire forward portion of the upper at its edge from one side around the toe to the other side and pulling said forward portion of the upper away from the side faces of the last, and means having a substantially continuous working edge for forcing the upper into lasted position and molding the upper upon the last bottom.

134. A machine of the class described having, in combination, means for working an upper over a last, and means for fastening the upper comprising tack holders movable substantially perpendicularly to the last bottom from a position out of the way of the overworking means into a position adjacent to the surface of the shoe bottom.

135. A machine of the class described having, in combination, means for working an upper over a last, mechanism for driving tacks at opposite sides of the shoe simultaneously, means for actuating said tack driving mechanism bodily perpendicularly to the shoe bottom from and toward driving position, and means for adjusting said mechanism transversely of the shoe for shoes of different widths.

136. A machine of the class described having, in combination, means for working an upper over a last, means for fastening the upper comprising tack holders movable substantially perpendicularly to the last bottom from a position out of the way of the overworking means into a position adjacent to the surface of the shoe bottom, tack drivers, and means for moving the tack holders into operative position.

137. A machine of the class described having, in combination, means for working an upper over a last, means for fastening the upper comprising tack holders movable substantially perpendicularly to the last bottom into a position adjacent to the surface of the shoe bottom, and means for actuating the drivers to insert the tacks, the insertion of the tacks following the positioning of the tack holders automatically.

138. A machine of the class described having, in combination, means structurally independent of the overworking means for working an upper over a last, means for inserting fastenings to secure the upper at opposite sides of the shoe, and manually operated means for adjusting the inserting mechanisms from and toward the median plane of the shoe for adapting them to shoes of different widths.

139. A machine of the class described having, in combination, means for gripping an upper at opposite sides of a last and means for supporting the last relatively arranged to pull the upper and to permit adjustment of the pulled upper and the last relatively, said machine having provision for permitting the tension on the upper to be relaxed during the adjusting operation.

140. A machine of the class described having, in combination, means for pulling an upper at a plurality of points, means for wiping the pulled upper into lasted position upon the last bottom, and means for supporting the last having provision for permitting the last to be tipped laterally and longitudinally to position its bottom face in the plane of the wipers.

141. A machine of the class described having, in combination, connected wipers for forcing the upper into lasted position about the toe portion of a last, and clamps yieldingly mounted upon the wipers and arranged to engage the upper in advance of the wipers to hold it against the side of the last while the wipers force its marginal portion over the last bottom.

142. A machine of the class described having, in combination, means for pulling an upper on a last at the toe and at opposite sides of the last, toe-lasting wipers for forcing the pulled upper over the edge of the last, and clamps moving with the wipers and arranged to clamp the upper against the sides of the last in advance of the action of the wipers.

143. A machine of the class described having, in combination, means for pulling an upper on a last at the toe and at opposite sides of the last, toe-lasting wipers adapted to pull the edge of the upper from the grippers and force it into lasted position, and clamps yieldingly carried by the wipers at the opposite sides of the last to bind the upper against the side of the last before the wipers pull it from the grippers.

144. A machine of the class described having, in combination, means for pulling an upper on a last at the toe and at opposite sides of the last, toe-lasting wipers, and means for inserting tacks to fasten the upper at the sides of the shoe, including a tack at each side adapted to anchor a binder extending around the toe of the shoe.

145. A machine of the class described having, in combination, means for pulling an upper on a last at the toe and at opposite sides of the ball of the last, toe-lasting wipers, and clamps occupying an inoperative position during the pulling operation and adapted to engage and force the upper against the last at the top face and at the opposite sides of the ball before the wipers force the upper over into lasted position.

146. A machine of the class described having, in combination, wipers for forcing an upper into lasted position over a last bottom and clamps operatively connected with the wipers and arranged for movement into holding engagement with the shoe in advance of the wipers.

147. A machine of the class described having, in combination, wipers for forcing an upper into lasted position over a last bottom, and a clamp operatively connected with the wipers and arranged for movement thereby from a position out of engagement with the last into binding engagement with the top face of the last.

148. A machine of the class described having, in combination, end-lasting wipers, an actuator therefor, a toe clamp 100, and lost motion connections from the clamp to said actuator whereby the wipers and clamp are first actuated together and then the wipers may be further actuated.

149. A machine of the class described having, in combination, means for supporting a shoe in position to present an unobstructed view to the operator, means for pulling over the shoe, said machine having provision for relative adjustments of the pulling means and the last to position the last and upper, a clamp for engaging the top face of the last over the ball to prevent the upper from bridging between the instep and the toe, means for moving the clamp from an inoperative position at one side of the shoe laterally toward operative position and means for moving the clamp into holding engagement with the shoe.

150. A machine of the class described having, in combination, a toe rest movable laterally with relation to the plane of the last bottom from and toward operative position, and means for actuating the rest perpendicularly to said plane to force it against the top face of the last.

151. A machine of the class described having, in combination, means for supporting a shoe in upright position, and grippers for pulling the upper constructed with substantially continuous gripping faces arranged to receive the marginal edge of the upper at the end and opposite sides of the shoe, said machine being arranged to present to the operator standing in working position a substantially unobstructed view of the top face of the shoe.

152. A machine for working an upper over a last having, in combination, grippers constructed and arranged to engage the upper at the end and at opposite sides of the last, and an abutment for the last bottom having a smooth acting face upon which the last may be moved for adjusting it with relation to the gripped upper to position the upper and last relatively.

153. A machine for working an upper over a last having, in combination, grippers constructed and arranged to engage the upper at the end and at opposite sides of the last, an abutment engaging the bottom of the last, and means for relatively moving the grippers and last to put the upper under tension, said parts being constructed and arranged to permit movement of the last upon the abutment for relatively adjusting the last within the upper.

154. A machine of the class described having, in combination, means for engaging an upper at the opposite sides and the toe end of a last, means for supporting and positioning the last, and mechanism for relatively actuating said two means to pull the upper, said parts being constructed and arranged to permit the last to be adjusted within the upper for relatively positioning the upper and the last longitudinally and transversely of the shoe.

155. A machine of the class described having, in combination, grippers having curved gripping edges formed in sections and relatively adjustable to vary the contour presented by their gripping edges, and means for actuating the grippers.

156. A machine of the class described having, in combination, grippers having curved sectional jaws to grip the upper at the end and the two sides of the toe portion of the shoe, said jaws being adjustable for toe portions of different shapes, and means for actuating the grippers.

157. A machine of the class described having, in combination, grippers having curved sectional jaws to grip the upper at the end and the two sides of the toe portion of the shoe, said machine having provision for independent adjustment of the jaws at the two sides of the shoe to adapt them for right and left crooked lasts, and means for actuating the grippers.

158. A machine of the class described having, in combination, grippers provided with substantially continuous gripping edges curved to grip the upper at the two sides and the toe end of the shoe and adjustable for shoes of different shapes, and means for actuating the grippers.

159. A machine of the class described having, in combination, grippers having curved jaws relatively adjustable, and means for actuating the jaws to grip and pull an upper.

160. In a machine of the class described, means for pulling an upper comprising grippers having curved gripping faces formed in sections and relatively adjustable to adapt them to shoes of different shapes.

161. A machine of the class described having, in combination, means for gripping an upper at the two opposite sides of the forepart of a last and pulling it over the last, said means being constructed and arranged to permit the last to be moved relatively to the grippers to adjust the upper about the last.

162. A pulling-over machine having, in combination, means for gripping an upper, means for supporting a last, and means for actuating the gripping means and the last to straighten the upper over the last under a light tension, said machine having provision for permitting relative adjusting movements of the upper and last to correct the position of the upper and provision for causing said actuating means to effect further relative movement of the upper and the last to stretch the upper after it has been adjusted.

163. A pulling-over machine having, in combination, means for gripping an upper, means for supporting a last, and actuating means adapted for operation to cause the upper to be seized and straightened over the last, and then to hold the upper under a light tension while the last and upper are relatively adjusted to correct the position of the upper, and for further operation to cause said actuating means to effect stretching of the upper snugly over the last.

164. A pulling-over machine having, in combination, means for gripping an upper, means for supporting a last, and actuating means adapted for operation to cause the upper to be seized and straightened over the last, and then to hold the upper under a ligt tension while the last and upper are relatively adjusted to correct the position of the upper, and for further operation to stretch the upper snugly over the last, together with means for forcing the upper into lasted position.

165. A machine of the class described having, in combination, last engaging means, means for gripping an upper at the end and opposite sides of the forward portion of a shoe and means for relatively actuating the last engaging means and the upper gripping means to put the upper under tension over the last, said machine being constructed and arranged to permit relative lateral movement of the last and the gripping means to be effected for straining of the upper at the toe end of the shoe laterally.

166. A machine of the class described having, in combination, means for gripping an upper at the end and opposite sides of the forward portion of a shoe, said means being mounted in the machine to restrain it from loose sidewise movement, and means for relatively actuating the last and the grippers to pull the upper, said machine having provision for a relative movement of a gripper and the last transversely of the machine while the upper is under tension.

167. A machine of the class described having, in combination, means for gripping an upper at the end and opposite sides of the forward portion of a shoe to pull the upper about a last, and last resting means, one of said two means being mounted for sliding movement transversely of the machine after the upper has been pulled.

168. A machine of the class described having, in combination, means for gripping an upper at the end and opposite sides of the forward portion of a shoe to pull the upper about a last, last resting means, and a guide in which one of said means is arranged for lateral, sliding adjustment transversely of the machine.

169. A machine of the class described having, in combination, means for gripping an upper at the end and opposite sides of the forward portion of a shoe to pull the upper about a last, last resting means and position controlling means for one of said first two means by which the pulling means and the last may be laterally adjusted relatively before and after the upper has been put under tension.

170. A machine of the class described having, in combination, grippers curved to receive the upper at the end and sides of the forward portion of the shoe and formed with two lateral sections which are relatively movable to adapt the grippers to receive the uppers of shoes of different widths.

171. A machine of the class described having, in combination, grippers curved to receive the upper at the end and sides of the forward portion of the shoe and formed in two sections relatively movable about a center substantially at the middle of their edge for adaptation to the shape of the last.

172. A machine of the class described having, in combination, means for working an upper over a last, including upper pulling and overlaying devices, and tack driving devices which are mounted to permit movement transversely of the shoe bottom into place to insert tacks at the desired distance from the edge of the shoe, and are movable bodily toward the plane of the last bottom from a remote position into tack inserting relation to the overlaid upper.

173. A pulling-over machine having, in combination, upper gripping and pulling devices, actuating mechanism for causing said devices to lay the upper over the opposite sides of the last bottom in position to be fastened, and tacking mechanism coöperating therewith and including tack and driver guides which are movable perpendicular to the plane of the shoe bottom into position to clamp the upper against the shoe bottom before the tack is driven.

174. A machine for preparing a shoe for the operation of fastening the upper to the sole on the last bottom, having, in combination, a toe rest adapted to occupy a position in which it permits an unobstructed view of the shoe, means for working the upper over the last and connected mechanism for moving the rest into operative engagement with the shoe and advancing the overworking means.

175. A machine for preparing a shoe for a subsequent operation on the shoe bottom having, in combination, a rest for the heel portion of the shoe, a rest for the toe portion of the shoe which is mounted for movement from and toward shoe engaging position, means movable lengthwise of the shoe for preparing the shoe for such further operation and connected mechanism for actuating said toe rest and said means simultaneously.

176. A machine of the class described having, in combination, gripper jaws curved to engage an upper at the end and opposite sides of the toe portion of a last, each jaw being formed in relatively movable sections, opposed jaw sections being adjustable together.

177. A machine of the class described having, in combination, gripper jaws curved to engage an upper at the end and opposite sides of the toe portion of a last, each jaw being formed in relatively movable sections, and means for adjusting pairs of opposed jaw sections together and independently of other pairs.

178. A machine of the class described having, in combination, wipers; means for actuating the wipers to advance and close over the toe of a shoe; and means independent of the wipers for engaging and holding the marginal edge of the upper at the end and for a substantial distance along the sides of the toe outwardly flared while the wipers advance.

179. A machine of the class described having, in combination, end embracing wipers and means for advancing and closing them to lay an upper over the end and sides of the toe portion of a last bottom; and gripping means relatively to which the wipers are closed and over which the upper may be spread out and gripped at the sides of the toe for holding those portions of the upper against the closing movement of the wipers.

180. In a lasting machine the combination with toe embracing wipers; of actuating means to advance the wipers over the end and close them over the sides of the toe; and means relatively to which the wipers have closing movement, said means including a member which is arranged with relation to the wipers to permit the upper at the sides of the toe to be outspread thereover and a coöperating member for gripping said outspread side portion of the upper.

181. A lasting machine having, in combination, means for holding the marginal edge of the sides and toe portion of an upper outspread from the last, members for holding the shoe between the sole and the opposed face of the shoe, means for effecting relative movement of the last and the upper holding means to stretch the upper, toe embracing wipers separate from the upper holding means, and means for actuating said wipers to advance over the end and close over the sides of the toe while the edge of the upper is maintained outspread in unwrinkled condition by said upper holding means.

182. A machine for working an upper over a last having, in combination, a plate over which the marginal portion of an upper can be outspread at the end and sides of the toe, means to grip the upper against said plate, a last bottom abutment, means relatively actuating the abutment and the upper gripping means to pull the toe portion of the upper, end embracing wipers, means for advancing the wipers and closing them over the sides of the toe to lay the upper in lasted position upon the shoe innersole, said upper gripping means being arranged and operated to hold the upper outspread during the overlaying movement of the wipers and to allow the upper to be pulled therefrom under tension by the wipers at the sides as well as at the end of the toe, and a toe rest between which and the wipers the upper can be compressed in overlaid position.

183. A machine of the class described having, in combination, end embracing wipers, and means for advancing and closing them to lay an upper over the end and sides of the toe portion of a last bottom; and coöperating gripping members substantially co-extensive with the acting edge of the wipers and between which the margin of the upper adjacent to the tip seam is spread outwardly and held away from the edge of the last bottom during the closing movement of the wipers.

184. In a lasting machine the combination with toe embracing wipers, actuating means to advance the wipers over the end and close them over the sides of the toe, and means independent of the wipers and arranged near the end portions of the wipers which work at the sides of the toe to receive and hold outturned edge portions of the upper while the wipers close between the last bottom and said holding means.

185. A machine for working an upper over a last having in combination, end embracing wipers and means for advancing and closing them to lay the upper over the last bottom at the end and sides of the toe; and upper holding means comprising a jaw having a curved inner edge substantially co-extensive with the edge of the wipers and constructed and arranged to receive the upper in outspread condition, and coöperating means to grip the upper and hold it frictionally on said jaw against the closing action of the wipers.

186. A machine for working an upper over a last having, in combination, end embracing wipers and means for advancing and closing them to lay the upper over the last bottom; and upper holding means comprising coöperating members which do not participate in the closing movement of the wipers and between which the upper at the end and also the sides of the toe portion of the shoe can be spread out and gripped to hold it from wrinkling during the wiper closing movement.

187. A machine of the class described having, in combination, toe embracing wipers, and means for advancing the wipers and closing them inwardly over the last bottom from opposite sides of the toe to lay the upper into lasted position; and upper gripping means relatively to which the wipers are movable and which is arranged to hold the upper outspread at the sides of the toe while the wipers advance and close to overlay the upper.

188. A machine of the class described having, in combination, end embracing wipers, and means for advancing and closing them to lay an upper over the end and sides of the toe portion of a last bottom, a plate substantially co-extensive with the wipers and relatively to which the wipers are closed and over which the upper may be spread outwardly, and means coöperating with said plate and constructed and arranged to grip the marginal edge of the upper against said plate and hold it away from the edge of the last bottom at the end of the toe and at the sides adjacent to the tip seam during the closing of the wipers.

189. A machine of the class described having, in combination, end embracing wipers, and means for advancing and closing them to lay an upper over the end and sides of the toe portion of a last bottom; a plate substantially co-extensive with the wipers, and means for gripping the upper thereto at the toe and at points adjacent to the ends of the wipers and holding those portions of the upper during the wiper closing movement.

190. A machine for working an upper over a last having, in combination, end embracing wipers and means for advancing and closing them to lay the upper over the last bottom; upper holding means comprising a member separate from the wipers over which the upper can be spread outwardly, at the end and for a substantial distance along the sides of the toe portion of the shoe, and a coöperating member to grip the upper and hold it against the first mentioned member in outspread condition at said points during the closing action of the wipers, and means for relatively actuating the last and said upper holding means substantially perpendicularly to the plane of the last bottom to pull the upper before it is overlaid by the wipers.

191. A machine of the class described having, in combination, wipers; means for actuating the wipers to advance and close over the toe of a shoe; and means independent of the wipers and including coöperating members substantially co-extensive with the wiper edges between which the upper can be spread outwardly away from the last edge and held in smooth unwrinkled condition from one side of the toe around to the opposite side of the toe while the wipers advance and close between the holding means and the last bottom to lay the upper over the last edge.

192. A machine of the class described having, in combination, end embracing wipers, and means for advancing and closing them to lay an upper over the end and sides of the toe portion of a last bottom, a plate having a formed edge made in two lateral sections relatively adjustable for shoes of different width and presenting an edge substantially co-extensive with the wipers, and means for holding the upper to said plate.

193. A machine of the class described having, in combination, wipers, means for actuating the wipers to advance and close over the toe of the shoe, and means for holding the marginal edge of the upper at the end of the toe outspread independently of the wipers and for holding the edge of the upper at the sides of the toe near the tip seam outspread while the wipers advance.

194. A machine of the class described having, in combination, wipers; mechanism for actuating the wipers to advance and close over the toe of a shoe; and means independent of the wipers for holding the marginal edge of the upper at the end and sides of the toe outspread while the wipers advance, said means having provision for adjustment to adapt it to hold the upper at the sides of wide and narrow shoes.

195. A machine of the class described having, in combination, wipers; mechanism for actuating the wipers to advance and close over the toe of a shoe; and means for holding the marginal edge of the upper at the end and sides of the toe outspread while the wipers advance, said means being arranged for adjustment of opposite side portions relatively to the median line of the machine for right and left crooked shoes.

196. A machine of the class described having, in combination, end lasting wipers, plates for supporting and actuating the wipers, means to effect adjusting movements of the wipers independently of the plates, and means for actuating the plates.

197. A machine of the class described having, in combination, toe embracing wipers, and means for actuating them to lay an upper over the toe portion of a last bottom, a plate over which the upper may be spread, said plate being formed in sections which are relatively adjustable to adapt the plate to toes of different widths, and means for holding the upper on said plate.

198. A machine of the class described having, in combination, toe embracing wipers, means for actuating the wipers and means for engaging and frictionally holding the upper at the two sides of the toe adjacent to the tip seam while the wipers are actuated, said holding means being former in sections which are adjustable laterally for shoes of different widths or shapes.

199. A machine of the class described having, in combination, toe embracing wipers for engaging the outer side of the upper materials and means for actuating said wipers to lay the upper over the toe portion of a last bottom, and means to engage the inner side of the upper materials, said means comprising two lateral sections and a support therefor relatively to which an adjustment of the sections can be maintained for operating with a series of toes of similar width or shape.

200. A machine of the class described having, in combination, toe embracing wipers extending on each side of the toe substantially to the tip seam, and means for actuating the wipers; and upper holding means coöperating with the end portions of the wipers to effect tensioning of the upper adjacent to the tip seam when the wipers are operated, said machine having provision for relative lateral adjustment of sections of the upper holding means at the two sides of the shoe for toes of different widths.

201. A machine of the class described having, in combination, toe embracing wipers extending on each side of the toe substantially to the tip seam, means for actuating the wipers; and upper holding means coöperating with the end portions of the wipers to effect tensioning of the upper adjacent to the tip seam when the wipers are operated.

202. In a machine for working an upper over a last, wipers, mechanism for advancing the wipers to force the upper over the edge of the last into lasted position, means located on the side of the wipers opposite the shoe for engaging a substantially continuous section of the upper extending around the curved portion of the toe of the shoe and applying tension to the upper while the wipers are advancing to lay the upper over the last, said means being adjustable for different widths of toes.

203. A machine for working an upper over a last having, in combination, means for gripping an upper at opposite sides of the forward portion of the last, and means including an abutment for the last for relatively moving the gripping means and last to pull the upper, said machine having provision for permitting turning movement of the last within the gripped upper about an axis extending longitudinally of the shoe.

204. A machine of the class described having, in combination, grippers constructed and arranged to have substantially continuous engagement with the upper from one side around the toe to the other side, an abutment engaging the last bottom between the toe and the rear ends of the grippers, and means for relatively actuating the grippers and the abutment to put the upper under tension, said machine having provision for movement of the last about the abutment to vary the relative tension on the upper at the toe and sides of the shoe.

205. A machine of the class described, comprising means presenting substantially continuous gripping surfaces for gripping an upper at the toe end and opposite sides of the fore part of the last, means for relatively moving the grippers and last to pull the upper, a heel rest movable into position for engaging the heel of the shoe, and means to actuate the heel rest to force the last longitudinally into the upper.

206. A machine of the class described, comprising means for engaging the upper, means for engaging the last, and means for relatively actuating said two engaging means to pull the upper about the last, said machine being constructed and arranged to permit the last to be adjusted in the pulled upper for positioning it with relation to the lines of the upper in a direction other than lengthwise of the last.

207. In a machine of the class described, the combination with grippers having a configuration corresponding to the outwardly flaring edge portion of upper material at the fore part of a last, of means for closing the grippers, means for relatively moving the last and grippers substantially perpendicularly to the last bottom to stretch the upper, wipers constructed and arranged to embrace the fore part of the shoe, and means to actuate the wipers for laying the upper over the last bottom.

208. In a machine of the class described, the combination with grippers having a configuration corresponding to the outwardly flaring edge portion of upper material at the fore part of a last and provided with sectional jaws having gripping faces extending obliquely with relation to the side face of the last, of means for closing the grippers, means for relatively moving the last and grippers substantially perpendicularly to the last bottom to stretch the upper, and means for laying the upper over the last bottom.

209. In a machine for working an upper over a last, the combination with grippers and actuating mechanism therefor, of means for moving the last away from the grippers to stretch the upper, wipers presenting a substantially continuous acting face for laying the upper over the bottom of the last at the end and opposite sides of the toe portion of the last, and a rest movable relatively to the wipers into and out of position to support the last against the pressure of the wipers.

210. In a machine for working an upper over a last, in which the last is positioned with its toe end uppermost, the combination with means for pulling the upper over the toe portion of the last, and wipers for laying the upper over the last bottom, of a toe rest adapted to engage a top face of the shoe and movable relatively to the wipers and against the shoe in a direction for pressing the shoe rearwardly toward the wipers.

211. In a machine of the class described, the combination with mechanisms for working an upper over a last, of tack-inserting mechanisms having provision for automatically feeding tacks, and manually operated means for inserting the tacks simultaneously at opposite sides of the last.

212. A machine of the class described having, in combination, means constructed and arranged for substantially continuous gripping engagement with an upper from one side of the last around the toe end of the last to the other side, said gripping means comprising suitable supporting and operating mechanism and sectional gripper jaws each having a curved acting face.

213. A pulling-over machine having, in combination, means for resting a last, toe pulling-over means arranged to engage the upper at each side of the center of the tip of the toe, said means being constructed to shape to the curvature of the toe of the last the entire marginal portion of the upper where held by said pulling-over means, said machine having provision for relative lateral movement of said toe pulling-over means and the adjacent portion of the last.

214. A pulling-over machine having, in combination, means for gripping an upper at the end and opposite sides of the forward portion of the shoe, means for relatively actuating the grippers and the last to pull the upper, and a heel rest mounted for lateral movement while in shoe resting position whereby the last may be shifted laterally with relation to the grippers.

215. A pulling-over machine having, in combination, means for gripping an upper at the end and opposite sides of the forward portion of the shoe, an abutment for the forward portion of the last arranged to permit the last to be moved laterally with relation to the grippers, means for relatively moving the abutment and the grippers for pulling the upper, and a rest for the heel of the last mounted for lateral movement while in shoe resting position to facilitate the lateral movement of the shoe on the abutment.

216. A pulling-over machine having, in combination, grippers for engaging the upper at the end and sides of the forward portion of the last, an abutment for the last bottom for forcing the pulled upper into lasted position, a heel rest mounted for movement laterally of the shoe while it is resting the shoe, and means for actuating the heel rest longitudinally of the shoe.

217. A pulling-over machine comprising means for engaging a last, grippers for engaging the upper at the end and the sides of the toe, means for relatively actuating said engaging means to pull the upper, said machine having provision for a dwell in the pulling-over operation during which may be effected angular movement of the last in the shoe to position the tip seam of the upper relatively to the median line of the last, and means to fasten the upper upon the last.

218. A pulling-over machine comprising shoe supporting means, pulling-over means, means arranged for movement, after the upper has been pulled, into and out of contact with the top face of the shoe in the region of the tip seam, and means adapted for moving the last lengthwise relatively to said last mentioned means.

219. A pulling-over machine having, in combination, means for gripping an upper at the end and opposite sides of the forward portion of a shoe, means for relatively actuating the grippers and the last to pull the upper, a heel rest mounted for lateral movement while in heel resting position, and means for actuating the heel rest longitudinally of the shoe.

220. A pulling-over machine having, in combination, means for gripping an upper at the ends and sides of the forward portion of a shoe, an abutment for the forward portion of the last arranged to permit the last to be moved laterally with relation to the grippers, a rest for the heel of the last mounted for lateral movement while in shoe resting position, and means for actuating the heel rest longitudinally of the shoe.

221. A pulling-over machine comprising means for pulling the upper over the last, and securing means adapted for securing the pulled over upper to the insole, in combination with means to support the assembled shoe with its toe pointing in a direction of non-intersection with the plane of the front of the machine and with the tip line in full view of the operative as he stands in working position at the machine.

222. In a machine of the class described, the combination with grippers constructed and arranged to grip an upper at the sides and toe of a last, of means for closing the grippers, means for relatively actuating the grippers and last to stretch the upper, means to wipe the upper over the bottom of the last into lasted position, and means for inserting fastenings through the upper and into an innersole on the last.

223. A machine of the class described, comprising grippers and actuating mechanism therefor, said grippers being constructed and arranged to have continuous engagement with the upper at the sides and end of the forepart of the last and to hold the upper out of contact with the sides of the last while the upper is pulled.

224. In a machine of the class described, the combination with grippers presenting substantially continuous gripping faces and constructed and arranged to engage the upper of the forepart of a shoe at the end and sides of the last and to pull the upper in lines oblique to the side faces of the last, of means for relatively moving the grippers and the last to stretch the upper, and means for laying the upper over the bottom of the last.

225. In a machine for working an upper over a last, the combination with grippers and actuating mechanism therefor, of means for moving the last away from the grippers to stretch the upper, wipers presenting a substantially continuous acting face for laying the upper over the bottom of the last at the end and opposite sides of the toe of the last, a rest movable relatively to the wipers into and out of position to support the last against the pressure of the wipers, and means for holding the rest in an inoperative position.

226. In a machine of the class described, the combination with grippers formed to receive simultaneously the outwardly flaring edge of the forepart of a shoe upper at the sides and end of the toe of the last, means for engaging the last, and means for relatively actuating said two means to pull the upper, of means for forcing the said edge portion of the upper over the last bottom, and mechanism for inserting tacks into the pulled upper and innersole.

227. In a machine of the class described, grippers constructed and arranged to engage the upper at the sides and end portion of a shoe, said grippers comprising coöperating jaws having a configuration adapting them to receive in its normal, outwardly flaring position at the sides and toe end of the shoe the forward part of an upper applied loosely to a last.

228. In a pulling-over and lasting machine, the combination with positioning means engaging a last, and upper pulling means, of operating mechanism for relatively actuating said two means to pull the upper, said machine being constructed and arranged to permit relative movement of said two means for adjusting the pulled upper about the last, and means adapted to work into finally lasted position a continuous section of the pulled and adjusted upper extending around the toe of the last.

229. In a machine of the class described, the combination with grippers for engaging an upper around the toe of the last, a rest for engaging the bottom of the last, and means for actuating the rest to sink the last into the upper, of means for working the upper into lasted position about the toe end of the last, said machine being constructed and arranged to permit movement of the grippers and the last to adjust the upper upon the last.

230. In a machine of the class described, the combination with means for pulling-over the upper and means for lasting the upper, of shoe supporting means occupying an inoperative position during the operation of the pulling-over means and movable into position to support the shoe during the operation of the lasting means.

231. In a machine of the class described, the combination with means for pulling an upper about the sides of a last, and means for changing the relative positions of the last and pulling means for causing the upper to be strained backwardly along the sides of the last, of lasting plates for forcing the upper of the forepart of a shoe inwardly from the sides of the toe and backwardly from the end of the toe into lasted position over the last bottom.

232. In a pulling-over and lasting machine, the combination with mechanism for pulling-over an upper loosely arranged upon a last including means permitting relative adjustment of the upper and the last for correctly positioning them after the upper has been pulled, of lasting mechanism for working the upper into lasted position after the operation of said pulling means and while the shoe remains in substantially the same position.

233. In a machine of the class described, the combination with means for pulling an upper simultaneously at opposite sides of a last, of means for moving the last and the pulling means relatively to strain the upper lengthwise of the last, and means for forcing the upper into lasted position all arranged to operate while the shoe remains in substantially the same position.

234. A machine of the class described having means for positioning a last, comprising a rest for the bottom of the last and a heel rest laterally movable to engage heels of differently shaped lasts, combined with means for pulling an upper on the last, and means for forcing the upper into lasted position, said lasting means being mounted to receive in substantially the same lateral position the foreparts of differently shaped lasts.

235. A machine of the class described having, in combination, pulling-over means, toe lasting means operating to force over the last bottom a continuous section of upper extending from one side around the toe to the other side, and heel resting means self-adapting to the heel ends of right and left crooked lasts the foreparts of which are positioned similarly relatively to the lasting means.

236. In a machine of the class described, the combination with wipers and means for actuating the wipers to work an upper into lasted position about the toe portion of a last, of a presser constructed and arranged to occupy during the overworking operation of the wipers a position to permit an unobstructed view of the forepart of the upper by the workman, and means for actuating the presser to engage the forepart of the shoe and force it against the wipers.

237. In a pulling-over and lasting machine, the combination with pulling-over mechanism and lasting mechanism constructed and arranged to operate upon a shoe remaining in approximately the same position in the machine, of supporting and guiding means for the lasting mechanism arranged to permit the lasting mechanism to occupy during the operation of the pulling-over mechanism a position on the same side of the plane of the last bottom as the innersole to permit an unobstructed view of the shoe upper by the workman.

238. A pulling-over and lasting machine having, in combination, means for pulling-over a shoe, means for lasting the toe portion and the sides of the forward part of the shoe, and means for inserting securing tacks at the sides of the shoe including tacks located for anchoring a binder in position to hold the toe portion of the shoe in lasted relation to the innersole.

239. A machine for pulling-over shoes and lasting the foreparts of the shoes having, in combination, pulling-over means constructed and arranged to permit relative adjustment of the upper and last, means for lasting the shoe, means for resting the shoe, and supporting connections for said three means permitting adjustment of one of said means relatively to another one laterally of the shoe for adaptation to right and left crooked lasts.

240. A machine for pulling-over and lasting shoes having, in combination, means for gripping the forward portion of the upper and pulling it on the last, wipers, means for actuating the wipers to work into lasted position a continuous section of the upper extending around the toe, a heel rest to resist the backward thrust of the toe wipers, and supporting and guiding means for the grippers, wipers and heel rest permitting relative lateral positioning movement for right and left lasts.

241. A machine for use in the manufacture of boots and shoes having, in combination, means engaging the end and opposite sides of the toe portion of an upper for pulling over the shoe, means for working a continuous section of the pulled over upper extending around the toe into lasted position, and a heel rest, said pulling-over means and heel rest being relatively adjustable transversely of the machine for adaptation to right and left crooked lasts.

242. A machine for use in the manufacture of boots and shoes having, in combination, means for pulling an upper over a last arranged to permit relative adjustment of the last and the pulled upper transversely of the last, lasting means constructed and arranged for working the pulled over upper into lasted position about the toe portion of the last, and a heel rest between which and the overworking means there is relative movement for adaptation of the machine to right and left lasts presented to the pulling-over and the lasting means.

243. A machine for use in the manufacture of boots and shoes having, in combination, means for engaging the forepart of an upper and operating to pull the upper over a last, means for working the tensioned upper into lasted position over the forward portion of the last, said machine being constructed and arranged to permit relative adjustment of the last and the pulled upper longitudinally of the last between the pulling and the lasting operations, shoe rear part resting means, and mountings for said pulling-over means, overworking means and resting means permitting relative lateral movement of the means acting at the forepart of the shoe and the means acting at the rear part of the shoe for adaptation of said means to coöperate in working upon shoes being made on right and left crooked lasts.

244. A pulling-over and lasting machine having means for gripping and pulling an upper at opposite sides of the forepart of a last, and means for resting the forepart of the last against the action of the pulling-over means, said two means being arranged to permit adjustment of the last and upper relatively to position the last in relation to the lines of the upper, combined with means for lasting the forward portion of the shoe, and means for holding the rear part of the shoe for the lasting operation, said holding means and said lasting means being relatively adjustable transversely of the shoe to adapt said means to coöperate in working upon shoes being made on right and left crooked lasts.

245. A pulling-over and lasting machine having, in combination, means for gripping and pulling an upper at opposite sides of a last, means whereby the last and the upper may be relatively adjusted after the upper is pulled, means for lasting the upper at the forward portion of the shoe, and a rest to resist the backward thrust of said lasting means, said rest being mounted for adjustment transversely of the machine for right and left lasts presented respectively with their foreparts in the required relation to the pulling-over and the lasting means.

246. A machine of the class described having, in combination, shoe positioning means adapted to present a shoe for lasting with its top face toward the operator and its sole face away from the operator, toe embracing wipers, and supporting and operating mechanisms for the wipers located on the same side of the plane of the top face of the shoe as is the bottom face of the shoe whereby a substantially unobstructed view of the top face of the shoe by the operator is permitted while the wipers are working the upper into lasted position.

247. A machine of the class described having, in combination, end embracing wipers and means for supporting and actuating said wipers to force upper materials over an innersole on the bottom face of a last, said supporting and actuating means being located on the same side of the plane of the last bottom as the innersole.

248. A machine of the class described having, in combination, end embracing wipers and means for supporting and actuating said wipers to force upper materials over an innersole on the bottom face of a last, said supporting and actuating means being located on the same side of the plane of the last bottom as the innersole and the machine being arranged to present a substantially unobstructed view of the top face of the shoe by the workman during the operation of the wipers.

In testimony whereof I have signed my name to this specification in the presence of two subscribing witnesses.

ELI BROTHERS.

Witnesses:
ARTHUR L. RUSSELL,
ELIZABETH C. COREPE.

It is hereby certified that in Letters Patent No. 1,135,945, granted April 13, 1915, upon the application of Eli Brothers, of Lynn, Massachusetts, for an improvement in "Machines for Use in the Manufacture of Boots and Shoes," errors appear in the printed specification requiring correction as follows: Page 6, line 53, for the word "portion" read *portions;* page 11, line 34, claim 19, for the article "the" read *its;* page 20, lines 62–63, claim 138, strike out the words "structurally independent of the overworking means;" same page and claim, line 64, after the word "means" insert the words *structurally independent of the overworking means;* page 22, line 38, claim 164, for the word "ligt" read *light;* page 25, line 19, claim 198, for the word "former" read *formed;* and that the said Letters Patent should be read with these corrections therein that the same may conform to the record of the case in the Patent Office.

Signed and sealed this 5th day of October, A. D., 1915.

[SEAL.]

R. F. WHITEHEAD,
*Acting Commissioner of Patents.*